(12) United States Patent
Jin et al.

(10) Patent No.: US 8,737,311 B2
(45) Date of Patent: *May 27, 2014

(54) TWO STAGE MOBILE DEVICE GEOGRAPHIC LOCATION DETERMINATION

(71) Applicant: T-Mobile USA, Inc., Bellevue, WA (US)

(72) Inventors: Zhengyi Jin, Bellevue, WA (US); Magesh Annamalai, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/760,018

(22) Filed: Feb. 5, 2013

(65) Prior Publication Data
US 2013/0150085 A1    Jun. 13, 2013

Related U.S. Application Data

(63) Continuation of application No. 12/446,453, filed as application No. PCT/US2007/082133 on Oct. 22, 2007, now Pat. No. 8,369,266.

(60) Provisional application No. 60/853,148, filed on Oct. 20, 2006.

(51) Int. Cl.
| | | |
|---|---|---|
| *H04L 12/66* | (2006.01) | |
| *H04W 74/00* | (2009.01) | |
| *H04L 12/56* | (2006.01) | |
| *H04W 4/12* | (2009.01) | |
| *H04W 76/02* | (2009.01) | |
| *H04W 88/04* | (2009.01) | |
| *G01S 5/02* | (2010.01) | |
| *G01S 19/25* | (2010.01) | |
| *H04W 4/20* | (2009.01) | |
| *H04L 29/08* | (2006.01) | |
| *H04W 4/02* | (2009.01) | |
| *H04B 7/26* | (2006.01) | |

(52) U.S. Cl.
CPC .............. *H04L 45/00* (2013.01); *H04W 4/12* (2013.01); *H04W 76/022* (2013.01); *H04W 88/04* (2013.01); *H04B 7/2693* (2013.01); *G01S 5/0252* (2013.01); *G01S 19/25* (2013.01); *H04W 4/20* (2013.01); *H04L 67/18* (2013.01); *H04W 4/02* (2013.01)
USPC ........... 370/328; 370/329; 370/352; 455/403; 455/404.2; 455/454; 455/456.2; 455/502; 342/357.64; 705/14.36; 705/26.1

(58) Field of Classification Search
CPC ....... G01S 19/24; G01S 19/25; G01S 19/252; G01S 19/51; H04B 7/2693; H04L 12/5895; H04L 45/00; G01C 21/005; G01C 21/367; H04W 40/20; H04W 8/08; H04W 92/02
USPC .................................................. 370/208–463
See application file for complete search history.

(56) References Cited

U.S. PATENT DOCUMENTS

| | | | |
|---|---|---|---|
| 5,724,660 A * | 3/1998 | Kauser et al. .............. 455/456.2 |
| 6,002,679 A | 12/1999 | Liu et al. | |
| 6,104,712 A | 8/2000 | Robert et al. | |
| 6,119,012 A | 9/2000 | Amirijoo | |
| 6,222,483 B1 * | 4/2001 | Twitchell et al. ........ 342/357.42 |
| 6,249,252 B1 | 6/2001 | Dupray | |
| 6,252,545 B1 | 6/2001 | Da et al. | |
| 6,463,288 B1 | 10/2002 | Havinis et al. | |
| 6,603,976 B1 | 8/2003 | Amirijoo et al. | |
| 6,603,978 B1 * | 8/2003 | Carlsson et al. .............. 455/502 |
| 6,665,611 B1 | 12/2003 | Oran et al. | |
| 6,671,514 B1 | 12/2003 | Cedervall et al. | |
| 6,690,659 B1 | 2/2004 | Ahmed et al. | |
| 6,801,778 B2 | 10/2004 | Koorapaty et al. | |
| 7,151,941 B2 | 12/2006 | Vanttinen et al. | |
| 7,177,399 B2 | 2/2007 | Dawson et al. | |
| 7,194,354 B1 | 3/2007 | Oran et al. | |
| 7,245,900 B1 * | 7/2007 | Lamb et al. ................ 455/404.1 |
| 7,272,500 B1 | 9/2007 | Walker | |
| 7,283,822 B2 | 10/2007 | Gallagher et al. | |
| 7,313,143 B1 | 12/2007 | Bruno | |
| 7,317,910 B2 | 1/2008 | Niemenmaa et al. | |
| 7,336,962 B2 | 2/2008 | Levitan | |
| 7,353,034 B2 | 4/2008 | Haney | |

| | | |
|---|---|---|
| 7,369,859 B2 | 5/2008 | Gallagher |
| 7,433,673 B1 | 10/2008 | Everson et al. |
| 7,436,789 B2 | 10/2008 | Caliskan et al. |
| 7,466,986 B2 | 12/2008 | Halcrow et al. |
| 7,577,431 B2 * | 8/2009 | Jiang .................... 455/432.1 |
| 7,593,605 B2 | 9/2009 | King et al. |
| 7,606,555 B2 | 10/2009 | Walsh et al. |
| 7,610,011 B2 | 10/2009 | Albrett |
| 7,620,404 B2 | 11/2009 | Chesnais et al. |
| 7,640,008 B2 | 12/2009 | Gallagher et al. |
| 7,653,394 B2 * | 1/2010 | McMillin ................ 455/444 |
| 7,664,494 B2 * | 2/2010 | Jiang .................... 455/432.1 |
| 7,676,394 B2 | 3/2010 | Ramer et al. |
| 7,688,261 B2 * | 3/2010 | DiEsposti ............. 342/357.64 |
| 7,714,778 B2 | 5/2010 | Dupray |
| 7,768,963 B2 | 8/2010 | Alizadeh-Shabdiz |
| 7,856,315 B2 * | 12/2010 | Sheha et al. .............. 701/412 |
| 7,903,029 B2 | 3/2011 | Dupray |
| 7,904,096 B2 | 3/2011 | Shyr et al. |
| 8,116,291 B2 | 2/2012 | Annamalai et al. |
| 8,145,183 B2 | 3/2012 | Barbeau et al. |
| 8,213,957 B2 * | 7/2012 | Bull et al. ............... 455/456.1 |
| 8,364,746 B2 | 1/2013 | Annamalai et al. |
| 8,369,266 B2 * | 2/2013 | Jin et al. ................. 370/328 |
| 8,509,731 B2 * | 8/2013 | Kholaif et al. ........... 455/404.2 |
| 2002/0064141 A1 | 5/2002 | Sakakura |
| 2002/0077144 A1 | 6/2002 | Keller et al. |
| 2002/0123354 A1 | 9/2002 | Nowak |
| 2003/0009385 A1 * | 1/2003 | Tucciarone et al. ......... 705/26 |
| 2003/0016648 A1 | 1/2003 | Lindsay et al. |
| 2003/0095069 A1 | 5/2003 | Stilp |
| 2003/0139182 A1 | 7/2003 | Bakkeby et al. |
| 2003/0216143 A1 | 11/2003 | Roese et al. |
| 2003/0222819 A1 | 12/2003 | Karr et al. |
| 2004/0087315 A1 | 5/2004 | Dufva et al. |
| 2004/0102196 A1 | 5/2004 | Weckstrom et al. |
| 2004/0122730 A1 * | 6/2004 | Tucciarone et al. ......... 705/14 |
| 2004/0142704 A1 | 7/2004 | Scholz |
| 2004/0157590 A1 | 8/2004 | Lazaridis et al. |
| 2004/0162896 A1 | 8/2004 | Cen et al. |
| 2004/0166856 A1 | 8/2004 | Niemenmaa |
| 2004/0198386 A1 | 10/2004 | Dupray |
| 2004/0202120 A1 | 10/2004 | Hanson |
| 2004/0203853 A1 | 10/2004 | Sheynblat |
| 2004/0203915 A1 | 10/2004 | van Diggelen et al. |
| 2004/0224702 A1 | 11/2004 | Chaskar |
| 2005/0003831 A1 | 1/2005 | Anderson |
| 2005/0059415 A1 | 3/2005 | Easo et al. |
| 2005/0066044 A1 | 3/2005 | Chaskar et al. |
| 2005/0070306 A1 | 3/2005 | Kim et al. |
| 2005/0075116 A1 | 4/2005 | Laird et al. |
| 2005/0079821 A1 | 4/2005 | Bi |
| 2005/0130673 A1 | 6/2005 | Annamalai |
| 2005/0136943 A1 | 6/2005 | Banerjee et al. |
| 2005/0138144 A1 | 6/2005 | Sethi |
| 2005/0148342 A1 | 7/2005 | Sylvain |
| 2005/0153687 A1 | 7/2005 | Niemenmaa et al. |
| 2005/0170851 A1 | 8/2005 | Melpignano et al. |
| 2005/0181805 A1 | 8/2005 | Gallagher |
| 2005/0186948 A1 | 8/2005 | Gallagher et al. |
| 2005/0192024 A1 | 9/2005 | Sheynblat |
| 2005/0286466 A1 | 12/2005 | Tagg et al. |
| 2006/0009235 A1 | 1/2006 | Sheynblat et al. |
| 2006/0014517 A1 | 1/2006 | Barclay et al. |
| 2006/0014548 A1 | 1/2006 | Bolin et al. |
| 2006/0015513 A1 | 1/2006 | Poyhonen et al. |
| 2006/0025158 A1 | 2/2006 | Leblanc et al. |
| 2006/0029296 A1 | 2/2006 | King et al. |
| 2006/0052115 A1 | 3/2006 | Khushu |
| 2006/0062363 A1 | 3/2006 | Albrett |
| 2006/0098899 A1 | 5/2006 | King et al. |
| 2006/0172732 A1 | 8/2006 | Nylander et al. |
| 2006/0178146 A1 | 8/2006 | Lee et al. |
| 2006/0194594 A1 | 8/2006 | Ruutu et al. |
| 2006/0212217 A1 * | 9/2006 | Sheha et al. ............... 701/209 |
| 2006/0258365 A1 | 11/2006 | Cha et al. |
| 2006/0276201 A1 | 12/2006 | Dupray |
| 2006/0286984 A1 | 12/2006 | Bonner |
| 2007/0060114 A1 | 3/2007 | Ramer et al. |
| 2007/0061198 A1 | 3/2007 | Ramer et al. |
| 2007/0061242 A1 | 3/2007 | Ramer et al. |
| 2007/0061243 A1 | 3/2007 | Ramer et al. |
| 2007/0061244 A1 | 3/2007 | Ramer et al. |
| 2007/0061245 A1 | 3/2007 | Ramer et al. |
| 2007/0061246 A1 | 3/2007 | Ramer et al. |
| 2007/0061247 A1 | 3/2007 | Ramer et al. |
| 2007/0061303 A1 | 3/2007 | Ramer et al. |
| 2007/0061317 A1 | 3/2007 | Ramer et al. |
| 2007/0072624 A1 | 3/2007 | Niemenmaa et al. |
| 2007/0073717 A1 | 3/2007 | Ramer et al. |
| 2007/0073718 A1 | 3/2007 | Ramer et al. |
| 2007/0073719 A1 | 3/2007 | Ramer et al. |
| 2007/0073722 A1 | 3/2007 | Ramer et al. |
| 2007/0073723 A1 | 3/2007 | Ramer et al. |
| 2007/0123237 A1 | 5/2007 | Cacioppo et al. |
| 2007/0155489 A1 | 7/2007 | Beckley et al. |
| 2007/0167174 A1 | 7/2007 | Halcrow et al. |
| 2007/0178913 A1 | 8/2007 | Niemenmaa et al. |
| 2007/0189497 A1 | 8/2007 | Bareis |
| 2007/0192294 A1 | 8/2007 | Ramer et al. |
| 2007/0192318 A1 | 8/2007 | Ramer et al. |
| 2007/0198485 A1 | 8/2007 | Ramer et al. |
| 2007/0239724 A1 | 10/2007 | Ramer et al. |
| 2007/0288427 A1 | 12/2007 | Ramer et al. |
| 2008/0009268 A1 | 1/2008 | Ramer et al. |
| 2008/0014956 A1 | 1/2008 | Balasubramanian |
| 2008/0045236 A1 | 2/2008 | Nahon et al. |
| 2008/0076420 A1 | 3/2008 | Khetawat et al. |
| 2008/0076429 A1 | 3/2008 | Comstock et al. |
| 2008/0081620 A1 | 4/2008 | Lu et al. |
| 2008/0096594 A1 | 4/2008 | Vinding |
| 2008/0108319 A1 | 5/2008 | Gallagher |
| 2008/0146245 A1 | 6/2008 | Appaji |
| 2008/0192696 A1 | 8/2008 | Sachs et al. |
| 2008/0280624 A1 | 11/2008 | Wrappe |
| 2009/0171583 A1 * | 7/2009 | DiEsposti .................. 701/213 |
| 2009/0185669 A1 | 7/2009 | Zitnik et al. |
| 2009/0275348 A1 | 11/2009 | Weinreich et al. |
| 2009/0311987 A1 | 12/2009 | Edge et al. |
| 2010/0046406 A1 | 2/2010 | Annamalai et al. |
| 2010/0069099 A1 | 3/2010 | Dunn et al. |
| 2010/0150120 A1 * | 6/2010 | Schlicht et al. ............... 370/338 |
| 2010/0289640 A1 | 11/2010 | Annamalai |
| 2010/0291947 A1 | 11/2010 | Annamalai |
| 2010/0331017 A1 | 12/2010 | Ariga |
| 2011/0039576 A1 | 2/2011 | Prakash et al. |
| 2011/0047033 A1 | 2/2011 | Mahaffey et al. |
| 2011/0051658 A1 * | 3/2011 | Jin et al. ..................... 370/328 |
| 2011/0051665 A1 | 3/2011 | Huang |
| 2011/0111726 A1 * | 5/2011 | Kholaif et al. ............. 455/404.2 |
| 2011/0159886 A1 * | 6/2011 | Kangas et al. ............. 455/456.1 |
| 2011/0200022 A1 | 8/2011 | Annamalai |
| 2012/0096490 A1 * | 4/2012 | Barnes, Jr. ................... 725/34 |
| 2012/0116677 A1 * | 5/2012 | Higgison et al. ............. 701/518 |
| 2012/0140749 A1 | 6/2012 | Caldwell et al. |
| 2012/0320888 A1 | 12/2012 | Annamalai et al. |
| 2013/0150085 A1 * | 6/2013 | Jin et al. .................... 455/456.2 |

FOREIGN PATENT DOCUMENTS

| | | |
|---|---|---|
| EP | 1583374 | 10/2005 |
| EP | 2051556 | 4/2009 |
| JP | 10239416 | 9/1998 |
| WO | WO-0027143 | 5/2000 |
| WO | WO-2005004528 | 1/2005 |
| WO | WO-2005060292 | 6/2005 |

OTHER PUBLICATIONS

Schulzrinne et al. "Emergency Services for Internet Telephony Systems," Oct. 18, 2004, Network Working Group, Internet Draft, pp. 1-20.

International Search Report and Written Opinion, International Application No. PCT/2006/41226, filed Oct. 20, 2006, Applicant: T-Mobile USA, Inc., Date of Mailing: Dec. 4, 2007, 18 pages.

Raja, K., et al. "We Know," IEEE Communication Engineer, Jun./Jul. 2004, 6 pages.

International Search Report and Written Opinion, International Application No. PCT/2007/82156, filed Oct. 22, 2007, Applicant: T-Mobile USA, Inc., Date of Mailing: May 28, 2008, 12 pages.

International Search Report and Written Opinion, International Application No. PCT/US2007/82133, Applicant: T-Mobile USA, Inc., filed Oct. 22, 2007, Date of Mailing: Apr. 29, 2008, 9 pages.

International Search Report and Written Opinion, International Application No. PCT/US2007/66579, filed Apr. 12, 2007, Applicant: T-Mobile, Inc., Date of Mailing: Sep. 9, 2008, 9 pages.

"IP Multimedia Subsystem," Wikipedia, http://wikipedia.org/wiki/IP_Multimedia_Subsystem, 13 pages [Last Accessed May 5, 2010].

"Enabler Release Definition for Secure UserPlane for Location," Candidate Version 1.0, Open Mobile Alliance, Jan. 22, 2007, 17 pages.

"Google Search of Location of Mobile," http://www.google.com/search?q=location+of+mobile&sourceid=ie7&rls=com.microsoft:en-us:IE-SearchBox&ie=&oe= [Last Accessed Jun. 8, 2010], 2 pages.

Annamalai, Magesh. "Method and Delivery of UMA Value Added Location Services Via SUPL," U.S. Appl. No. 60/853,086, filed Oct. 20, 2006, 15 pages.

"Secure User Plane for Location Requirements," Candidate Version 1.0, Open Mobile Alliance, Jun. 16, 2006, 80 pages.

"Secure User Plane for Location Architecture," Candidate Version 1.0, Open Mobile Alliance, Jan. 22, 2007, 80 pages.

"The 3GPP Standard for Convergence-Diagram," UMA Universal Mobile Access, http://www.umatoday.com/img/diagrams/umaServices.jpg, [First Accessed Oct. 17, 2007], 1 page.

"The 3GPP Standard for Convergence-Dual Mode Handsets," UMA Universal Mobile Access, UMA Today, 2007, 2 pages.

"The 3GPP Standard for Convergence-Femtocells," UMA Universal Mobile Access, UMA Today, 2007, 2 pages.

"The 3GPP Standard for Convergence-Softmobiles," UMA Universal Mobile Access, UMA Today, 2007, 2 pages.

"The 3GPP Standard for Convergence-Terminal Adaptors," UMA Universal Mobile Access, UMA Today, 2007, 2 pages.

"UserPlane for Location Protocol," Candidate Version 1.0, Open Mobile Alliance, Jan. 22, 2007, 56 pages.

Dyoub, J. et al. "Dueling Architectures: Control plane vs. Userplane," HP Invent, 2004, 2 pages.

Gum, Arnold et al. "Infrastructure Wireless Choices for LBS," GPS World, Mar. 2, 2006, http://www.gpsworld.com/wireless/infrastructure/wireless-choices-lbs-3750?print=1, [Last Accessed Apr. 28, 2010], 5 pages.

International Search Report and Written Opinion, International Application No. PCT/US2007/82136, Applicant: T-Mobile USA, Inc., filed Oct. 22, 2007, Date of Mailing: Mar. 11, 2008, 11 pages.

Spinney, Jonathan. "Wireless Location Uses in the User Plane and Control Plane," The Location Based Services Community, Jun. 27, 2005, 3 pages.

International Search Report and Written Opinion, International Application No. PCT/US2010/035010, Applicant: T-Mobile USA, Inc., filed May 14, 2010, Date of Mailing: Dec. 22, 2010, 10 pages.

International Search Report and Written Opinion, International Application No. PCT/US2010/035014, Applicant: T-Mobile USA, Inc., filed May 14, 2010, Date of Mailing: Dec. 28, 2010, 11 pages.

Martin-Escalona, et al. "Delivery of Non-Standardized Assistance Data in E-OTD/GNSS Hybrid Location Systems," IEEE 2002, pp. 1-5.

Steinfield. "The Development of Location Based Services in Mobile Commerce," Elife after the dot.com bust, Berlin, Springer, 2004, pp. 1-15.

Extended European Search Report, EP Patent Application 07760606.9, mailed Jan. 23, 2013, 8 pages.

European Patent Office, Extended European Search Report, EP Patent Application 06826444.9, mailed Sep. 12, 2012, 8 pages.

* cited by examiner

*Primary Examiner* — Phirin Sam
*Assistant Examiner* — Venkatesh Haliyur
(74) *Attorney, Agent, or Firm* — Perkins Coie LLP

(57) ABSTRACT

A system and method for mitigating the delay associated with using GPS technologies to determine the location of a mobile device. The system utilizes a two-stage location determination process. During the first stage, an estimated position of the mobile device is immediately provided based on the most accurate stored location information that is available to the system. If greater accuracy is still required, during the second stage a more accurate position of the mobile device is provided using GPS-based technologies.

20 Claims, 14 Drawing Sheets

TWO STAGE MOBILE DEVICE GEOGRAPHIC LOCATION DETERMINATION

CROSS-REFERENCE TO RELATED APPLICATION(S)

This application is a continuation of U.S. application Ser. No. 12/446,453, filed Nov. 12, 2010, now U.S. Pat. No. 8,369,266 issued Feb. 5, 2013, which is a U.S. National Stage application of International Application No. PCT/US07/82133, entitled TWO STAGE MOBILE DEVICE GEOGRAPHIC LOCATION DETERMINATION, filed Oct. 22, 2007, which claims the priority of U.S. Provisional Application No. 60/853,148, entitled LOCATION ALGORITHM WITH MULTIPLE POSITIONING METHODS FOR GAN NETWORKS, filed Oct. 20, 2006, each of which is hereby incorporated by reference in its entirety.

BACKGROUND

A variety of technologies enable telecommunication services to be offered using Internet Protocol (IP). Commonly referred to as Voice over IP, or VoIP, such technologies enable telecommunications on any public or private IP network, including the Internet. VoIP technology permits a user to receive IP-based telecommunications services through a variety of devices, including a desktop computer, a notebook computer, an analog handset used in conjunction with a VoIP telephone adapter, a VoIP-enabled handset, or other like device.

Increasingly, mobile devices, such as notebook computers, personal digital assistants (PDAs), wireless handheld devices, wireless handset devices, or other similar mobile devices, are also being enabled to receive IP-based telecommunications services. Such services are provided by enabling the mobile device to communicate with a wireless router and access any IP-based wireless access network, such as a network based on the IEEE 802.16 (WiMAX), IEEE 802.20 Mobile Broadband Wireless Access (MBWA), Ultra Wideband (UWB), 802.11 wireless fidelity (Wi-Fi), and Bluetooth standards.

Moreover, dual-mode mobile telecommunications devices may be enabled to communicate with any IP-based wireless access network. For instance, Unlicensed Mobile Access (UMA) technology allows wireless service providers to merge cellular networks, such as Global System for Mobile Communications (GSM) networks, and IP-based wireless networks into one seamless service with one mobile device, one user interface, and a common set of network services for both voice and data. UMA technology has recently been accepted into release 6 of the 3rd Generation Partnership Project (3GPP) standard as a General Access Network (GAN). With UMA or GAN solutions, subscribers may move between cellular networks and IP-based wireless networks with seamless voice and data session continuity as transparently as they move between cells within the cellular network. Seamless in-call handover between the IP-based wireless network and cellular network ensures that the user's location and mobility do not affect the services delivered to the user. Services may be identical whether connected over the IP-based wireless network or the cellular network. UMA technology effectively creates a parallel radio access network, the UMA network, which interfaces to the mobile core network using standard mobility-enabled interfaces. The mobile core network remains unchanged. The common mobile core network makes it possible for the service provider to have full service and operational transparency. The existing service provider Business Support Systems (BSS), service delivery systems, content services, regulatory compliance systems, and Operation Support Systems (OSS) can support the UMA network without change. Service enhancements and technology evolution of the mobile core network apply transparently to both cellular access and UMA.

A number of problems exist in locating a mobile device on an IP-based wireless telecommunications network and providing location based services to the mobile device. Telecommunications service providers increasingly offer location-based services that deliver information specific to the mobile device's current location. Telecommunications service providers also wish to route certain calls, such as 911 or "emergency" calls, to an office that is geographically relevant to the user of a mobile device. Service providers who operate IP-based wireless telecommunications networks must therefore implement systems and methods that determine the mobile device's location on an IP-based wireless telecommunications network.

BRIEF DESCRIPTION OF THE DRAWINGS

Non-limiting and non-exhaustive embodiments of the present invention are described with reference to the following drawings.

DETAILED DESCRIPTION

Figure 1:
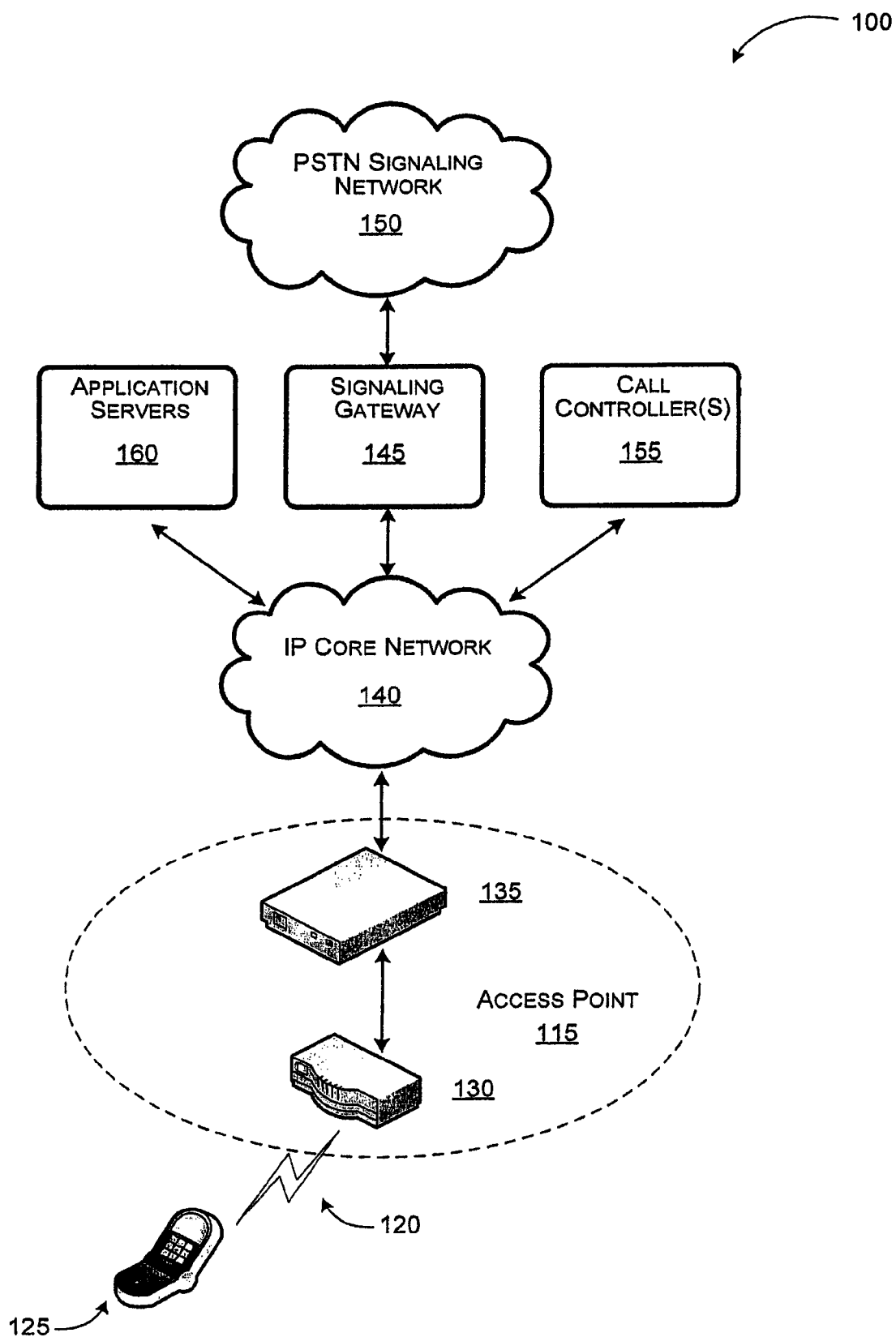
FIG. 1 is an illustration of an example Voice over IP system.

Briefly stated, the present disclosure relates to a system and method for locating the geographic position of a mobile device when in communication with an IP-based wireless telecommunications network. A wireless connection between the mobile device and the IP-based wireless telecommunications network is established when the mobile device registers with a network controller (NC) through an access point (AP). When a geographical position is needed for the mobile device (e.g., a 911 call), messages are exchanged between the NC and a serving mobile location center (SMLC), where the SMLC retrieves information from a database that is used to identify the geographic position of the mobile device. The database can store a variety of information related to mobile devices such as: last known position, IP address, MAC address, a mobile or subscriber identifier (such as an International Mobile Subscriber Identity (IMSI)), last CGI, etc. The geographical position is communicated back to the NC, which can then forward the position information to a switch for processing such as for 911 calls.

A system and method for mitigating the delay associated with using GPS technologies to determine the location of a mobile device is also disclosed. The system utilizes a two-stage location determination process. During the first stage, an estimated position of the mobile device is immediately provided based on the most accurate stored location information that is available to the system. If greater accuracy is still required, during the second stage a more accurate position of the mobile device is provided using GPS-based technologies.

The positioning and two-stage processing system may be useful when the mobile subscriber issues a 911 emergency call or when a mobile subscriber (MS) wishes to receive value added location based services (such as information regarding nearby restaurants, gas stations, entertainment complexes and similar locations of interest). In the case of emergency services the call is routed to a public safety answering point (PSAP) and is forwarded to the proper services. The PSAP receives the caller's phone number and the exact geographic location of the mobile device from which the call was made.

The following description provides specific details for a thorough understanding of, and enabling description for, various embodiments of the technology. One skilled in the art will understand that embodiments of the technology of the present disclosure may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this specification.

Various embodiments will be described in detail with reference to the drawings, where like reference numerals represent like parts and assemblies throughout the several views. References to various embodiments do not limit the scope of the invention, which is limited only by the scope of the claims attached hereto. Additionally, any examples set forth in this specification are not intended to be limiting and merely set forth some of the many possible embodiments for the claimed invention.

Example VoIP and IP-Based Wireless Telecommunications Networks

FIG. 1 illustrates the components of a generalized Voice over Internet Protocol (VoIP) system 100 for mobile communication devices. The system comprises one or more access points (APs) 115 that can accept communications 120 from mobile devices 125. The access point includes a wireless router 130 and a broadband modem 135 that enable connection to an Internet Protocol (IP) network 140. IP network 140 may be one or more public networks, private networks, or combination of public and private networks. IP packets that carry communications from the mobile device 125 are received at the access point 115 and transported through the IP network 140 to a signaling gateway 145. Signaling gateway 145 can typically be operated by a service provider and converts the VoIP signal to a traditional phone service signal. The phone signal is then conveyed to the intended recipient via a public switched telephone network (PSTN) 150. A call controller 155 that is located in the service provider's network provides call logic and call control functions. An application server 160 that is located in the service provider's network provides logic and execution of one or more applications or services that are offered by the server provider, such as implementing various access and security rules.

The VoIP system depicted in FIG. 1 is an architecture that broadly enables a mobile device to receive IP-formatted telecommunication services. One example application of the described technology is for an Unlicensed Mobile Access (UMA) network that allows cellular service providers to offer their products and services seamlessly over Internet-connected broadband networks. Mobile devices may utilize licensed spectrums (such as spectrums for cellular communications) and alternate licensed, semilicensed and unlicensed spectrums (such as spectrums for IP-based wireless communication). For example, dual-mode cellular phones may access a cellular network, such as a GSM network, or an IP-based wireless network, such as a network based on the IEEE 802.16 (WiMAX), IEEE 802.20 Mobile Broadband Wireless Access (MBWA), Ultra Wideband (UWB), 802.11 wireless fidelity (Wi-Fi), or Bluetooth standards. The IP-based networks are accessed via wireless access points (APs) that are typically connected to a DSL (Digital Subscriber Line) modem, a cable modem, a satellite modem, or any other broadband Internet connection. The access points (APs) may be public or private, and may be located in a subscriber's home, in other apartments or residences, in public locations such as coffee shops, libraries, or schools, or in corporate locations.

When a mobile device accesses an IP-based wireless network, information is initially formatted in the cellular system's native protocol and then encapsulated into Internet Protocol (IP) packets, transmitted to the access point (AP), and communicated over the Internet to the cellular service provider's mobile core network. Such transmissions bypass the service provider's existing network of radio towers. Because the same cellular protocols are used in communications involving IP access points (APs) as with traditional radio towers, the cellular service provider maintains a large degree of system compatibility even though using an IP-based network. The systems of the cellular service provider that deliver content and handle mobility may not even need to be aware that a subscriber's mobile device is on an IP-based wireless telecommunications network. The system may instead assume the mobile device is on its native cellular network. The IP network is therefore abstracted with respect to the cellular network, regardless of whether the mobile device connects to the cellular network via a base station (for licensed spectrum access) or a wireless access point (for licensed, semilicensed and/or unlicensed spectrum access).

A non-exhaustive list of products and services available on IP-based wireless telecommunications networks includes not only voice services, but also supplementary services like call forwarding and call waiting, text messaging services like SMS, and data-based services like ringtone downloads, game downloads, picture messaging, email and web browsing. Further, since a mobile device is connected to an IP network, a wide variety of data services available over such networks may be provided to the mobile device.

Figure 2A:
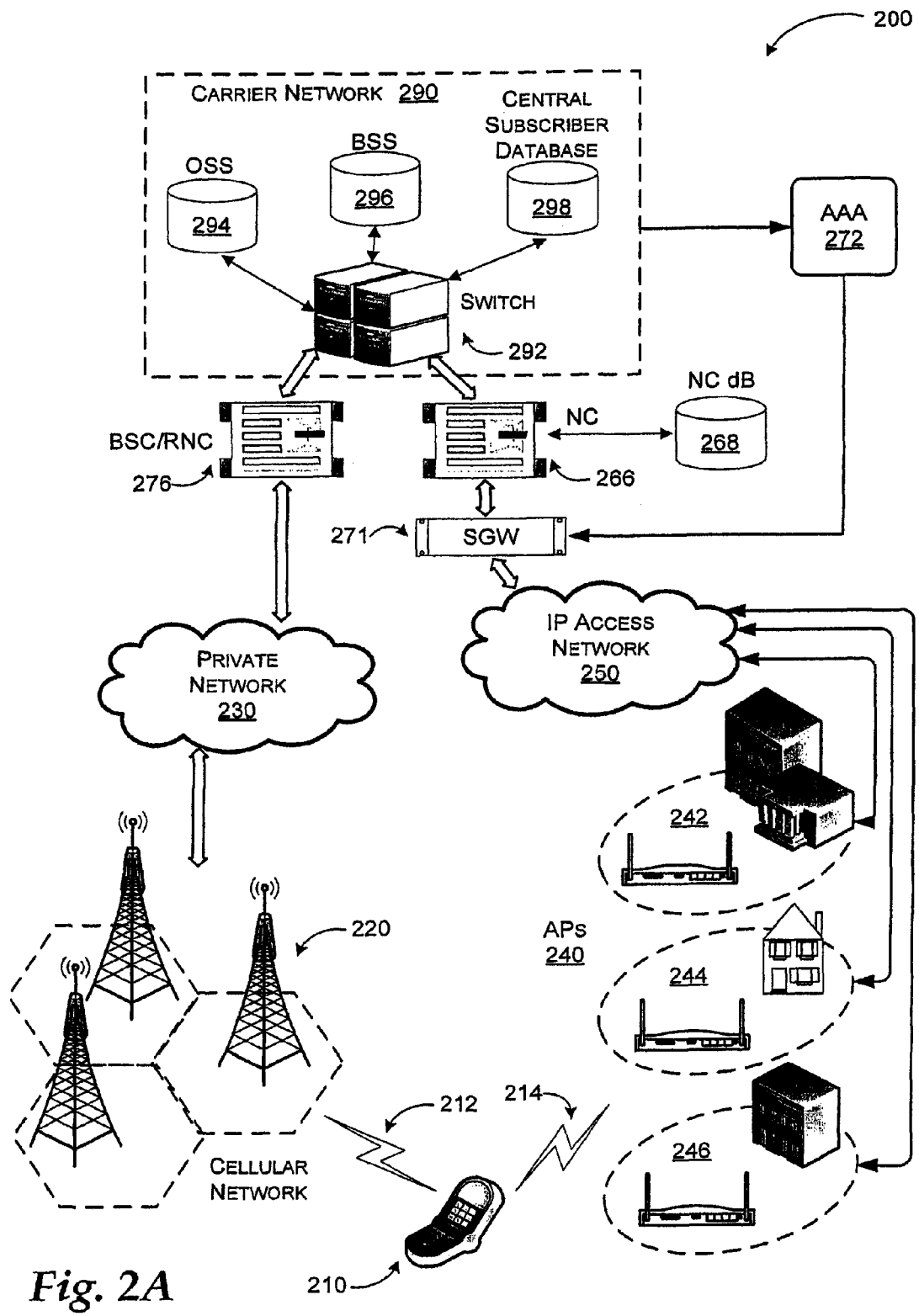
FIG. 2A is an illustration of an example converged wireless network combining a cellular network with an IP-based access network.

FIG. 2A is an illustration of an example system 200 that combines a cellular telephone network with an IP-based wireless telecommunications network into a converged wireless network. The described system 200 accepts registration requests and call connections from a mobile device 210 to either a cellular telephone network or to an IP-based wireless network.

The example cellular telephone network includes one or more cell towers 220 that are configured to accept cellular communications 212 from mobile device 210. The cell towers 220 are connected to a controller (such as a base station controller/radio network controller (BSC/RNC)) 276 via a private network 230. The private network 230 can include a variety of connections such as T1 lines, a wide area network (WAN), a local area network (LAN), various network switches, and other similar components. Cell tower controller 276 controls network communication traffic to the carrier network 290, where all communications are managed. An example carrier network 290 includes a switch (such as a mobile switching center (switch)) 292, which is configured to control data/call flows, perform load balancing, as well as other functions. A variety of system databases may also be accessed in the carrier network such as, e.g., an operation support subsystem (OSS) database 294, a business support system (BSS) database 296, and a central subscriber database that contains details of a carriers' subscribers (such as a home location register (HLR)) 298, for billing, call logging, etc.

The example IP-based wireless network includes one or more access points (APs) 240 that can accept IP communications 214 from mobile device 210. An access point can be configured as part of a wireless network in one or more locations such as a public network 242, a home network 244, or a private business network 246. Each access point is coupled to an Internet Protocol (IP) network 250 through a broadband connection. IP packets that carry communications (data, voice, SMS, etc.) are routed from the access points to a security gateway (SGW) 271 through the IP network 250. The security gateway controls access to the network controller (such as a UMA Network Controller (UNC)) 266, which communicates with a database 268 for logging and/or accessing various data associated with communications. The network controller 266 is also configured to manage access with the carrier network 290 in a similar manner to that performed by the BSC/RNC 276.

Authentication of a request for access by a mobile device over the IP-based network is handled by the security gateway 271, which communicates with an authentication, accounting and authorization (AAA) module 272 as shown in FIG. 2A. Challenges and responses to requests for access by the mobile device are communicated between a central subscriber database 298 and the AAA module 272. When authorization is granted, the security gateway 271 communicates the assignment of an IP address to the mobile device 210 that requested access. Once the IP address is passed to the mobile device 210 by the security gateway 271, the public IP address assigned to the device is passed to the network controller 266.

Figure 2B:
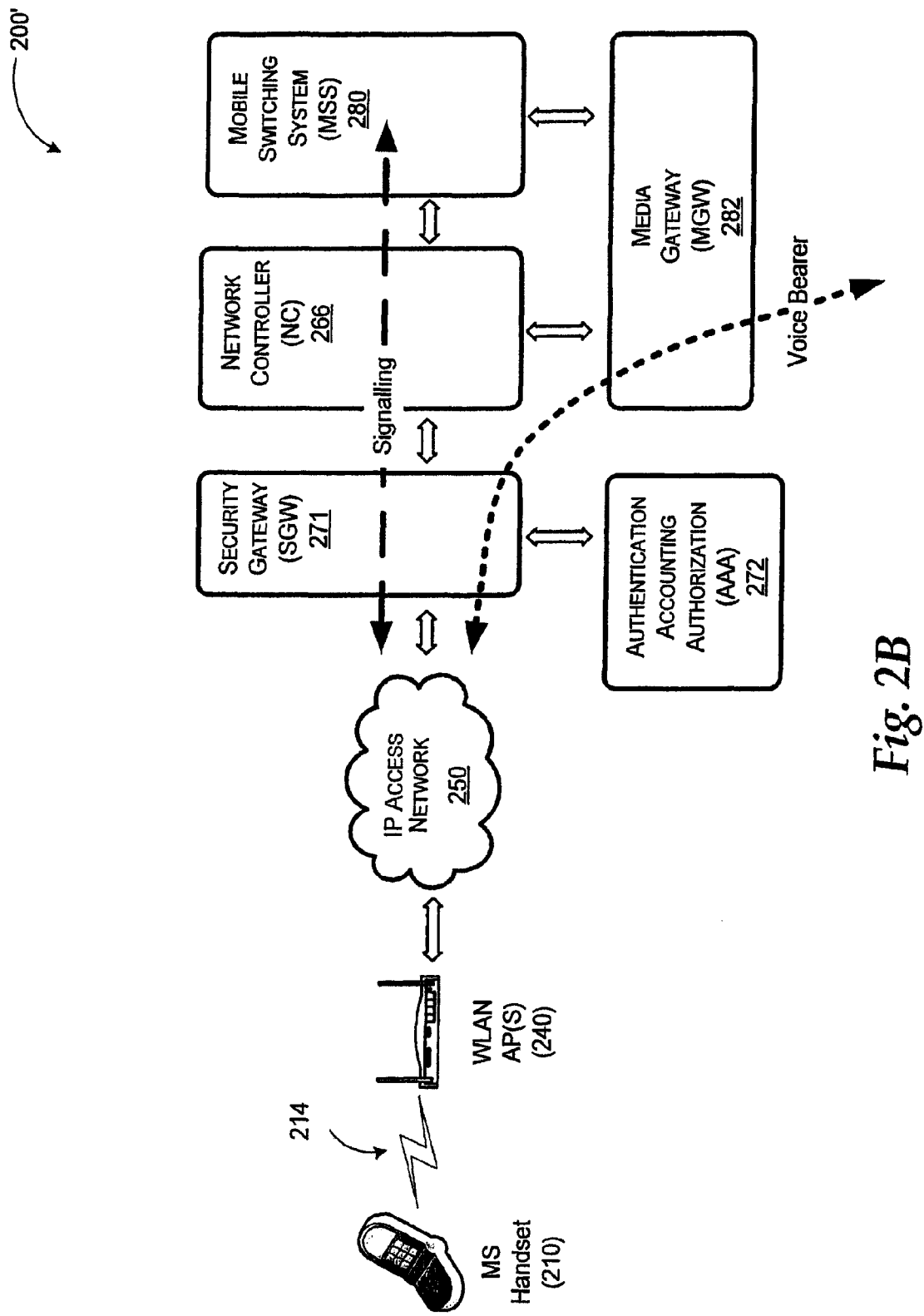
FIG. 2B is another illustration of an example converged wireless network combining a cellular network with an IP-based access network.

FIG. 2B illustrates another example system that combines a cellular telephone network with an IP-based network (in this case, a UMA network) into a converged wireless network. The described system 200' accepts registration requests and call connections from a mobile device 210 to either a cellular telephone network (not shown) or to an IP-based wireless network. The system 200' includes one or more access points (AP) 240 that accept communications 214 from mobile device 210. Each access point is coupled to an IP network 250 through a broadband connection. IP network 250 routes communications (data, voice, SMS, etc.) between the access points and a security gateway (SGW) 271. The security gateway 271 controls access to the network controller 266, which communicates with a database (not shown) for logging and accessing various data associated with communications. Authentication, accounting, and authorization are handled by SGW 271 via AAA module 272, as previously described.

For the example system 200', the signaling path of an IP-based call is routed through the network controller 266 to a mobile switching system (MSS) 280, while the voice bearer path is routed through the network controller 266 to a media gateway (MGW) 282. The signaling portion of a communication governs various overhead aspects of the communication such as, for example, when the call starts, when the call stops, initiating a telephone ring, etc. The voice bearer portion of the communication contains the actual content (either data or voice information) of the communication. The MGW 282 controls the content flow between the service provider and the mobile device 210, while the MSS 280 controls the signaling flow (or controls overhead-related flow) between the service provider and the mobile device 210.

It will be appreciated that the network elements are described herein as performing certain functions. Those functions could be performed by other elements in the same or differing networks, which could reduce the number of network elements. Alternatively or additionally, network elements performing those functions could be replaced by two or more elements to perform portions of those functions.

Example Location System in an IP-Based Wireless Telecommunications Network

Figure 3:
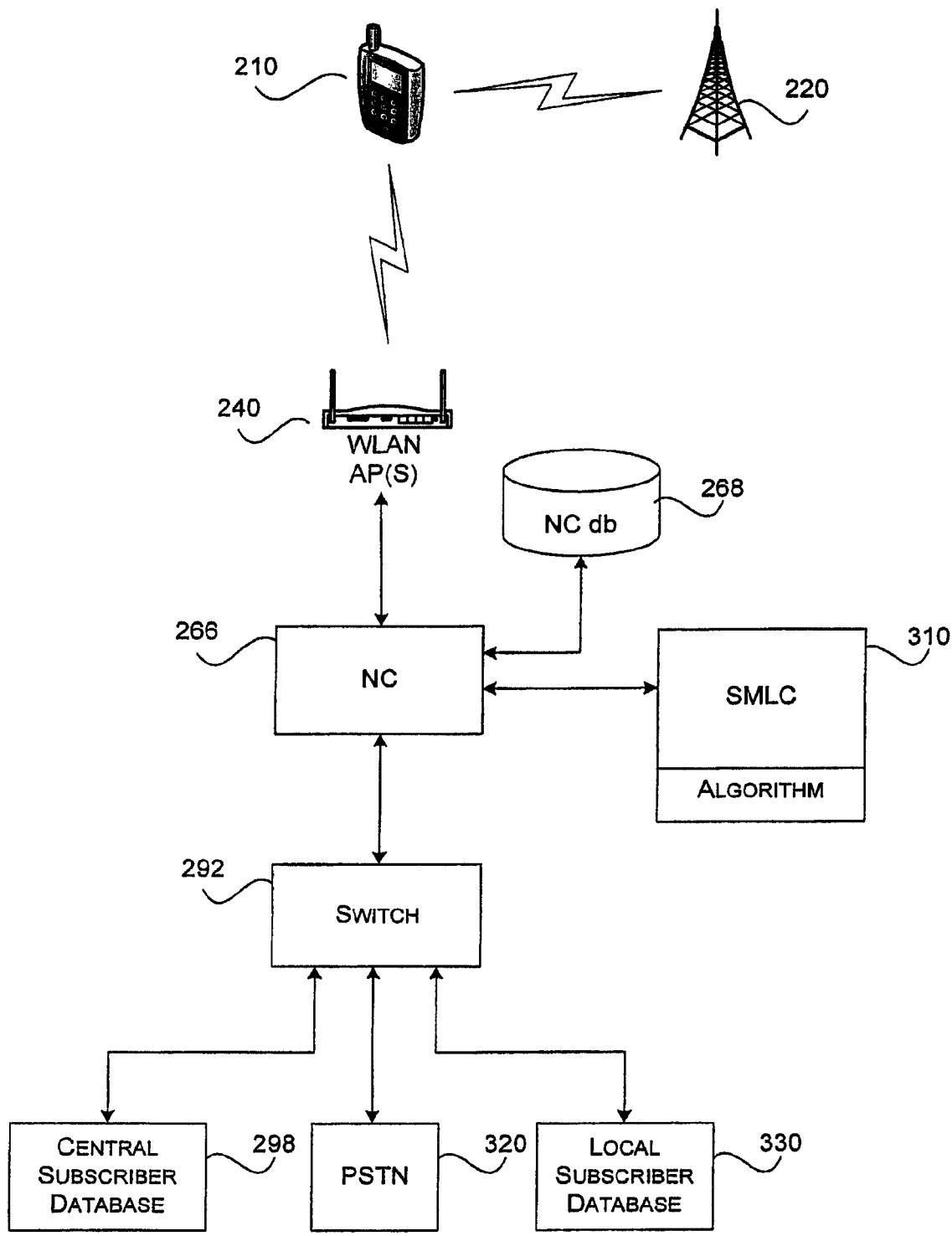
FIG. 3 is an illustration of a positioning system for estimating the geographic position of a mobile computing device.

FIG. 3 illustrates a positioning system for locating the geographic position of a mobile device in either a wireless VoIP network or a converged cellular network and IP-based wireless telecommunications network (in this case, a UMA network). The system includes a mobile device 210, one or more access points 240, a network controller (NC) 266, a data store such as an NC database 268, a serving mobile location center (SMLC) 310, and a switch 292. Switch 292 may access a central subscriber database 298, a public switched telephone network (PSTN) 320, and a local subscriber database 330. In one embodiment, mobile device 210 is a dual-mode unit capable of communicating on a cellular network via cell tower 220 and an IP-based wireless telecommunications network via access point 240. SMLC 310 includes a location algorithm for different access networks. NC database 268 may be internal or external relative to NC 266. NC database 268 may serve more than one NC 266.

Figure 4:
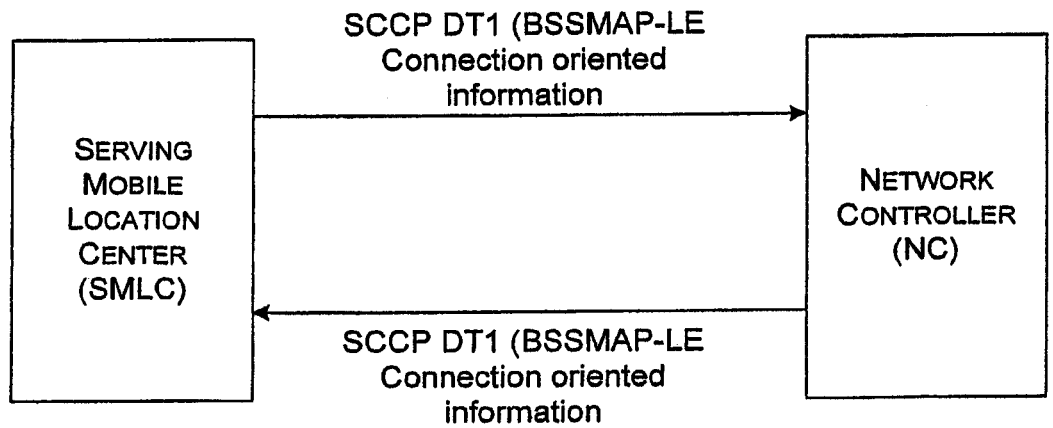
FIG. 4 is an illustration of the transfer of information between a serving mobile location center and a network controller.

FIG. 4 is a functional block diagram that illustrates the transfer of information between the serving mobile location center (SMLC) and the network controller (NC). The positioning request is received at the NC. The NC serves as a particular target mobile device. The SMLC obtains information related to the location of the mobile computing device from the NC.

The SMLC passes a base station subsystem mobile application part-location extraction (BSSAP-LE) connection oriented information message to the NC. The NC contains an embedded BSSLAP message. BSSLAP defines the SMLC-BSS layer 3 protocol. The BSSAP-LE message is transferred using a Signaling Connection Control Part (SCCP) connection that was previously established between the SMLC and the NC when the positioning request for the target mobile device was initially sent to the SMLC. The NC recognizes that it is the final destination due to the presence of the embedded BSSLAP message.

When the NC has positioning information for the target mobile device to return the SMLC, the NC sends a BSSAP-LE connection oriented message to the SMLC containing an embedded BSSLAP message. The message is sent using the SCCP connection previously established for locating the target mobile device.

Example Process Flows for a Location System

Figure 5:
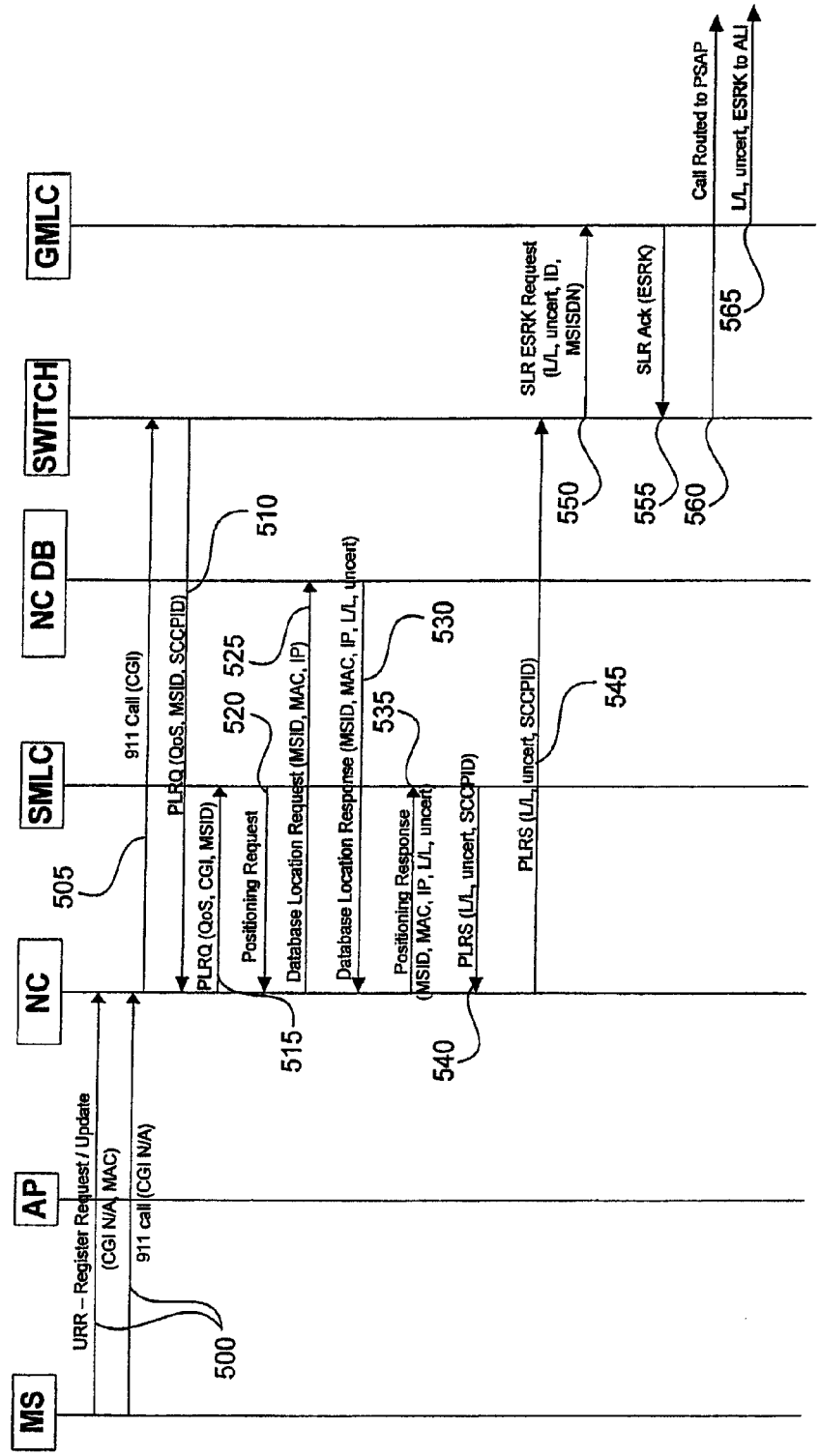
FIG. 5 is an illustration of a process for the transfer of information between system components when a 911 emergency call is executed from a mobile computing device.

FIG. 5 is a process flow diagram that illustrates the transfer of information between system components when a 911 emergency call is executed from a mobile computing device or mobile subscriber (MS). While the invention is described with reference to a 911 emergency call, it is understood that the method described could be used with reference to any call executed from a mobile computing device for location determination purposes. The process flow is described below with reference to processing steps 500-565.

Step 500: The mobile subscriber (MS) registers for access as a wireless device using an IP-based telecommunications network. The registration process is initiated between the MS and the network controller (NC) via the access point (AP). The MS also identifies a wireless radio resource (e.g. a GSM CGI radio resource) and a corresponding MAC address during the registration request. For this example, the MS dials 911, which is communicated to the NC.

Step 505: The NC forwards the 911 call to the switch for routing. The cell global identity (CGI) associated with the MS is forwarded to the switch for further processing.

Step 510: The switch sends a position location request (PLRQ) message to the NC based on the received 911 call. The PLRQ message includes MS information associated with a quality of service (QoS), a device or subscriber identifier (MSID), and an SCCP identifier (SCCPID). The MSID is registered with the network when the MS accesses the network.

Step 515: The NC forwards the PLRQ message to the SMLC. The PLRQ message includes QoS, CGI, and MSID information for the MS.

Step 520: The SMLC sends a positioning request message to the NC.

Step 525: The NC sends a database location request message to the NC database. The database location request message includes MS information for the MSID associated with the mobile device, a MAC address associated with the AP, and an IP address associated with the AP.

Step 530: The NC database provides information for one or more locations to the NC in the form of a database location response message, which may include the subscriber's address, AP location and public IP address serving area. The NC database may also provide an uncertainty rating that provides the likelihood that the identified location of the MS is accurate.

Step 535: The NC sends a positioning response message to the SMLC, where the positioning response message includes all the locations information from the NC database to the SMLC. The SMLC executes an algorithmic process to calculate the location of the MS using the information received above to determine the final latitudinal-longitudinal coordinates and the associated uncertainty rating. The algorithmic processes are discussed in detail below with reference to FIGS. 8-12.

Step 540: The SMLC returns the calculated location information to the NC via a position location response (PLRS) message. The PLRS message includes the latitudinal-longitudinal coordinates (L/L), the uncertainty rating and the SCCPID.

Step 545: The NC forwards the PLRS message with the location information to the switch.

Step 550: The switch communicates a service location request (SLR) emergency service routing key (ESRK) Request message to the gateway mobile location center (GMLC), which requests a determination of the PSAP information based on the location of the MS.

Step 555: The GMLC communicates an SLR Ack message, which returns PSAP information with an ESRK.

Step 560: The switch routes the call to the proper PSAP based on the ESRK received from the GMLC.

Step 565: The location of the MS is delivered to an application location interface (ALI) for PSAP access.

Figure 6:
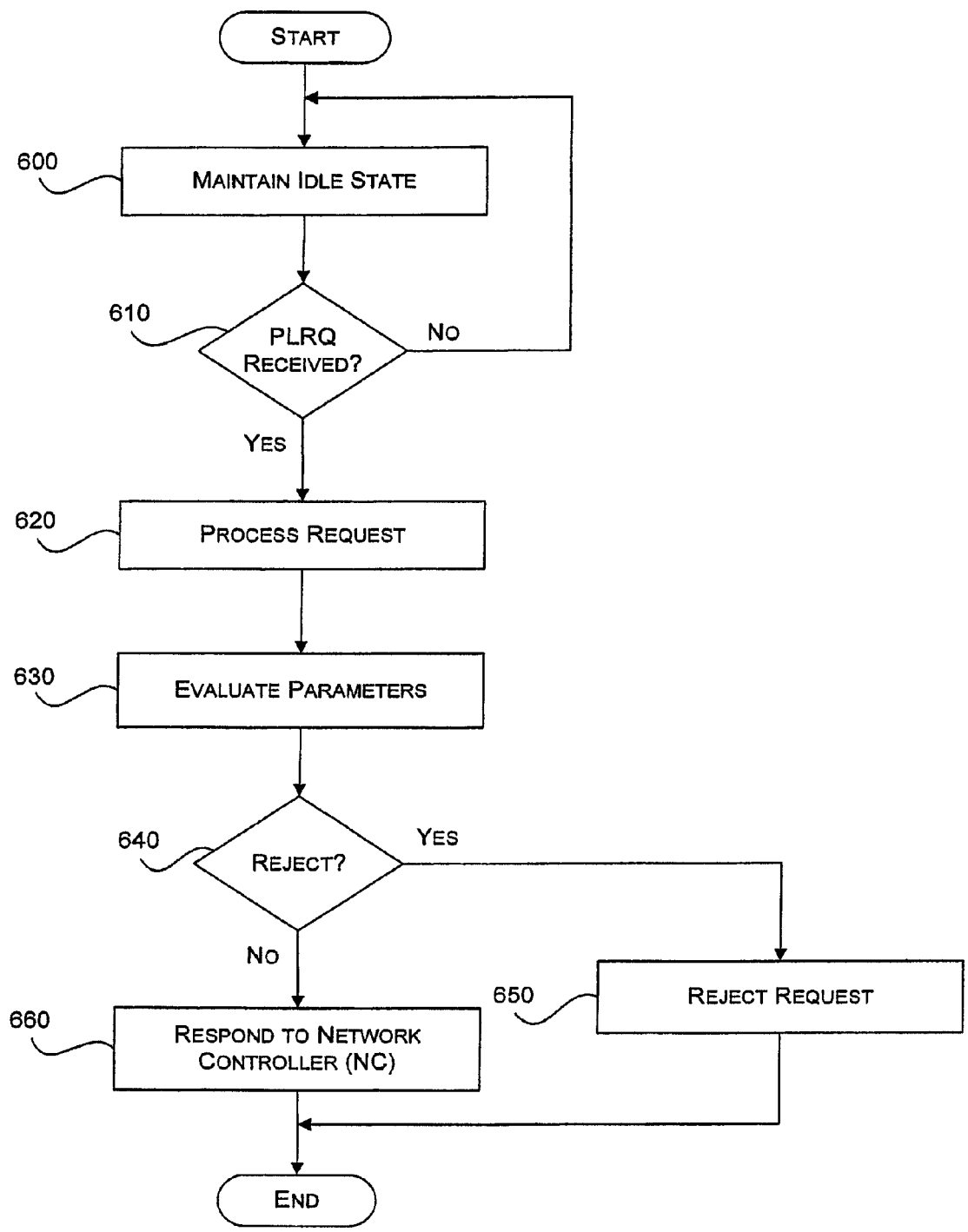
FIG. 6 is an illustration of a process for determining a mobile computing device location from the perspective of the serving mobile location center.

FIG. 6 is an operational flow diagram illustrating a process for determining a mobile computing device or mobile subscriber (MS) location from the perspective of the SMLC. The SMLC maintains an idle state at block 600.

Continuing to decision block 610, a determination is made whether a position location request (PLRQ) message is received from the NC. If a PLRQ message is not received, processing continues at block 600 where the SMLC waits in an idle state for the PLRQ message. If a PLRQ message is received, processing continues from block 610 to block 620.

The PLRQ message is processed at block 620. The SMLC sends a positioning request to the NC. The NC returns a positioning response to the SMLC.

Moving to block 630 the parameters are evaluated. The SMLC executes an algorithm to calculate the location of the MS using at least one of: the subscriber's address based on a mobile or subscriber identifier (such as an IMSI) associated with the mobile computing device; the access point location based on the MAC address associated with the access point; the serving area of the IP address associated with the access point and the uncertainty rating for each of the above locations.

Advancing to decision block 640, a determination is made whether to reject the positioning request. If the request is to be rejected, processing continues to block 650 where the request is rejected. Otherwise, processing proceeds to block 660 where the SMLC returns the location information to the NC via a position location response (PLRS) message.

Figure 7:
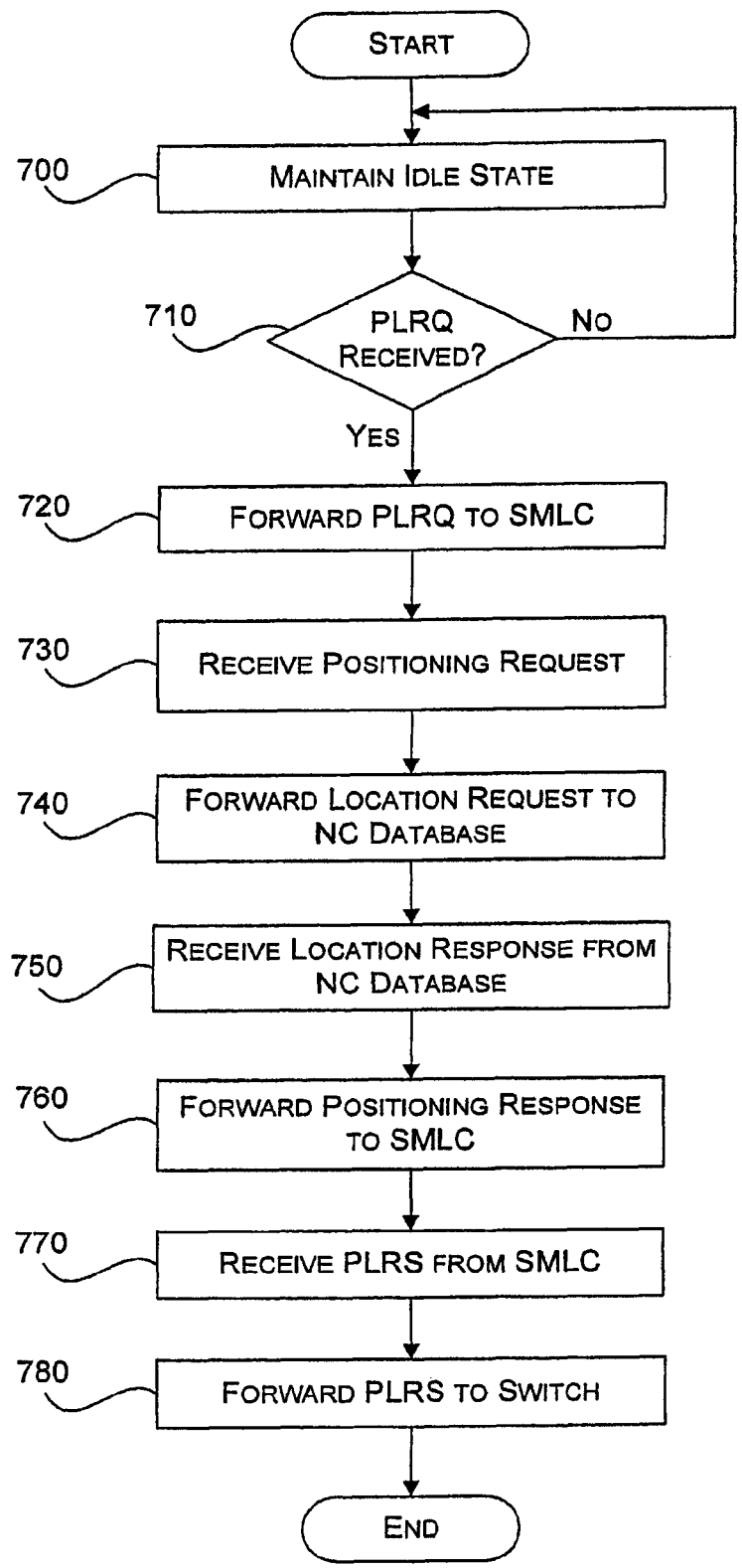
FIG. 7 is an illustration of a process for determining a mobile computing device location from the perspective of a network controller.

FIG. 7 is an operational flow diagram illustrating a process for determining a mobile computing device location from the perspective of the network controller (NC). The NC maintains an idle state at block 700.

Continuing to decision block 710, a determination is made whether a PLRQ message is received from the switch. If a PLRQ message is not received, processing continues at block 700 where the NC waits in an idle state for the PLRQ message. If a PLRQ message is received, processing continues at block 720.

The NC forwards the PLRQ message to the SMLC at block 720.

Continuing to block 730, the NC receives a positioning request from the SMLC.

Advancing to block 740, the NC forwards a location request (e.g., a database location request message) to the data store (e.g., an NC database).

Moving to block 750, the NC receives a location response (e.g., a database location response message) from the data store (e.g., an NC database). The location response includes at least one of: the subscriber's address based on a mobile or subscriber identifier (such as an IMSI) associated with the MS, the access point location based on the MAC address associated with the access point, the serving area of the IP address associated with the access point and the uncertainty rating for each of the above locations.

Proceeding to block 760, the NC forwards a positioning response to the SMLC.

Transitioning to block 770, the NC receives a position location response (PLRS) message from the SMLC. The PLRS message includes the location information for the mobile computing device (e.g., latitudinal-longitudinal information, uncertainty rating, and SCCPID).

The NC forwards the PLRS message with the location information to the switch at block 780.

A location-based services algorithm determines the location of a mobile computing device when a call is initiated based on different information. The algorithm is useful in any application that utilizes positioning technology, e.g. for routing emergency calls (911) to the correct location, and for locating mobile subscribers for location service applications. The algorithm may also be useful for billing based on caller location and call destination. The algorithm is executed in the serving mobile location center to generate estimated latitude/longitude coordinates of the mobile computing device location.

Example Location Estimation System

Figure 8:
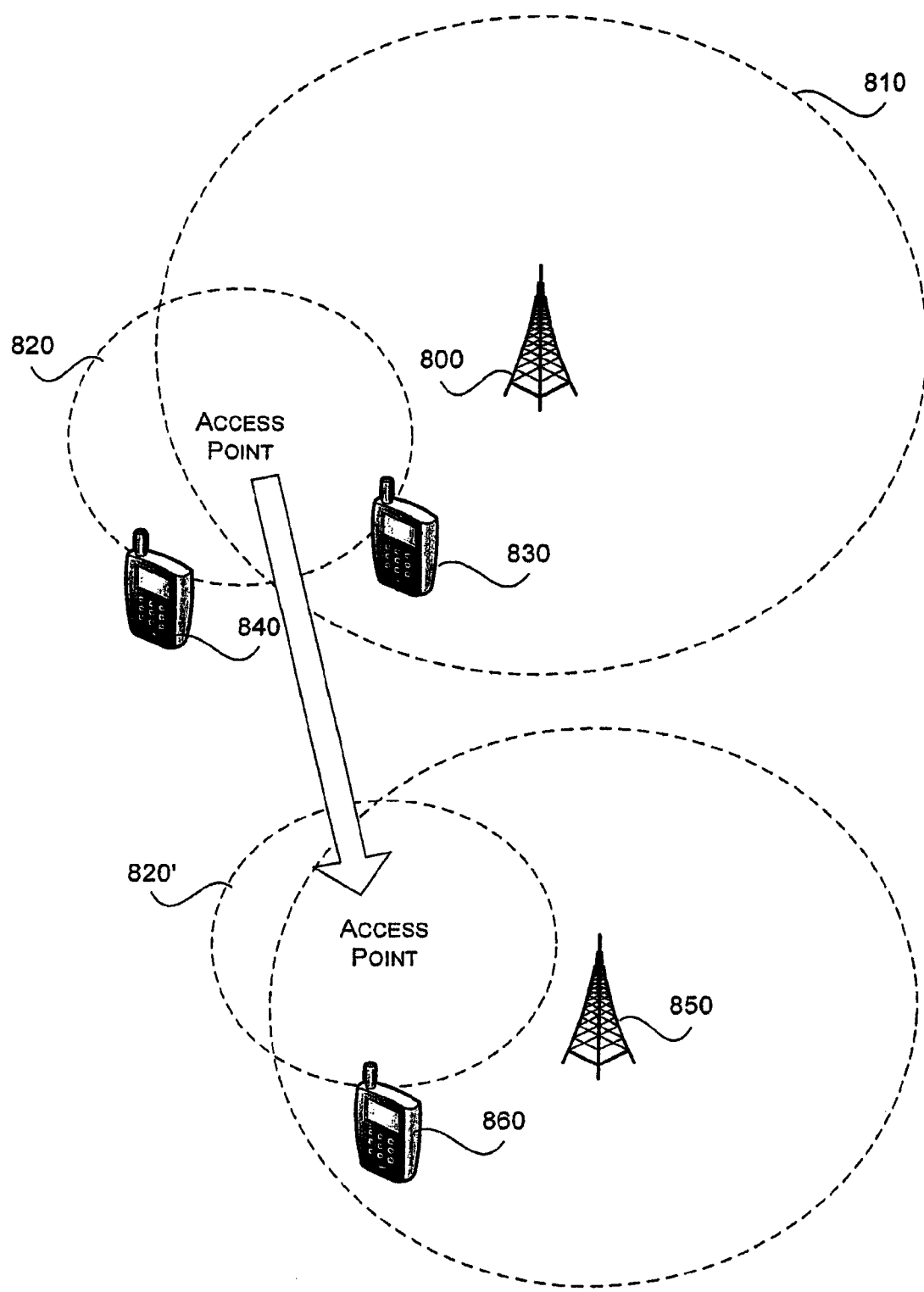
FIG. 8 is an illustration of a system for estimating the location of the mobile computing device when a mobile computing device accesses a data network via an access point.

FIG. 8 illustrates a system for estimating the location of the mobile computing device when a mobile computing device accesses a data network via an access point. The system may execute a positioning technology known as a "scrubbing process" to locate the mobile computing device. The system includes at least one cell tower 800 that has a defined coverage area 810. The geographic location of each cell tower is known such that latitude/longitude coordinates for each cell tower are available. An access point 820 to the data network may have a coverage area that overlaps coverage area 810.

The scrubbing process is implemented as an algorithm on a selected network element of the system. In some embodiments, the algorithm is implemented as a software program that is executed by a processor (e.g., a micro-processor, a micro-controller, a special purpose processor, or a general purpose processor) in the selected network element. In other embodiments, the algorithm is implemented by one or more hardware components that are arranged to process algorithmically in the selected network element. In still other embodiments, the algorithm is implemented by a combination of hardware and software components in the selected network element.

Registration messages are sent from all of the mobile computing devices accessing the data network. Each registration message can identify an access point (AP) that is associated with the entry point into the data network. The registration message is associated with a cell global identity (CGI) record, which can identify a particular cell tower along with an access time (e.g., time-date stamp). The registration message information is analyzed to associate an access point identity (e.g., a MAC Address of the access point, an IP Address of the access point, etc.) with one or more cell towers. The mapping between access points with cell global identities can be implemented according to a statistical model. Historical information concerning the association between access points and cell towers can be maintained by the system for later use.

The mobile computing device may be identified when the mobile computing device accesses the data network. In one embodiment, the mobile computing device is identified using global positioning system coordinates that are communicated to the data network from the mobile computing device. In another embodiment, the mobile computing device is identified based on an identifier reported by the mobile computing device. Example identifiers include an access point MAC or IP address. The identifier is compared to a database of geographic locations indexed by the reported identifier. An example database includes a look-up table of MAC address locations. In yet another embodiment, the identifier is sent from the mobile computing device as a query to a provider of the data network to determine the geographic location of a particular IP address.

In one example, a mobile computing device attempts to access a data network through an access point, where the mobile computing device is unable to detect a nearby cell tower. For this example, cell tower information reported by another mobile computing device can be used to map the access point to a particular location, where the other mobile computing device obtained access to the data network through the same access point with a successfully detected cell tower identified from its registration. Since the historic information is retained by the system, subsequent mobile computing devices that are unable to detect a cell tower are able to take advantage of cell tower information from previous mobile computing devices that were able to detect a cell tower with a recent registration message.

A mobile computing device registers with the UMA system by submitting a registration message when connecting to the data network. The registration message contains the location information of the access point through which the mobile computing device is connecting to the data network. The registration message may also contain cell information (if such information is available). The mobile computing device reports the current cell information if the mobile computing device is currently associated with a cell tower. If the mobile computing device is not currently associated with a cell tower, the mobile computing device reports the cell information of the last associated cell tower within a pre-defined time limit (e.g., 1 hour). Otherwise, the mobile computing device does not report cell information.

If the mobile computing device reports cell tower information, an indicator is also supplied in the message to identify if the cell information is for a current cell tower or a most recent cell tower accessed by the mobile computing device. For example, mobile computing device 830 may access the data network via cell tower 800. Mobile computing device 830 may then connect to the network via access point 820. Mobile computing device 830 sends a registration message that identifies the location information associated with access point 820 and cell tower 800 (e.g., a cell global identity to MAC address mapping of latitude/longitude coordinates), and an indicator that cell tower 800 is current rather than recent.

The network controller (NC) can receive registration messages from different mobile computing devices. The scrubbing process uses the information received from NCs in the data network to associate each AP with a specific cell tower. Latitude/longitude coordinates for each AP may be determined based on the known location of the associated cell tower. For example, AP 820 may be within a building. Data network coverage may be available in one area of the building such that mobile computing device may access the network via cell tower 800 or AP 820. However, coverage may not be available in another area of the building (e.g., the basement) such that mobile computing device 840 may only access the network via AP 820. Mobile computing device 840 may attempt to use a service that requires location information (e.g., initiate an emergency call). Although a specific cell tower is not identified with the registration information from mobile computing device 840, the device is determined to be located at AP 820 as a result of the reported cell information from mobile computing device 830, which previously reported the cell information when registering for access through AP 820.

Since many mobile computing devices can access the data network through different access points, a database may be created that maps the APs to the corresponding cell towers via a CGI to MAC address mapping of locations (e.g., latitude/longitude coordinates). The database can be accessed to locate mobile computing devices that have registered through an AP without reporting a cell tower. In one embodiment, the database of access point/cell tower mappings is periodically purged (e.g., data is deleted after sixty hours). In another embodiment, the database is constrained to a fixed size.

APs are generally positioned at fixed locations. However, a mobile access point may be moved closer to a different cell tower. For example, AP 820 may be moved manually or via some other means (e.g., the AP is located on a train) such that AP 820' is closer to cell tower 850. Mobile computing device 860 accesses the network at AP 820' and submits a registration that identifies cell tower 850 rather than cell tower 800. The scrubbing process may be arranged to recognize that other mobile computing devices are registering on AP 820' with cell tower 850. The database may be updated when a number (e.g., a predetermined threshold, a majority, an average, recent registration requests, etc.) of the records indicate that the location of AP 820' should be mapped to the location of cell tower 850 (e.g., latitude/longitude coordinates for cell tower 850). Thus, a dynamic relationship is established between APs and corresponding cell towers. In one embodiment, the AP may be constantly moving between two cell towers (e.g., on a ferry). The location of the mobile computing device may be identified at a median distance between the two cell towers.

Figure 9:
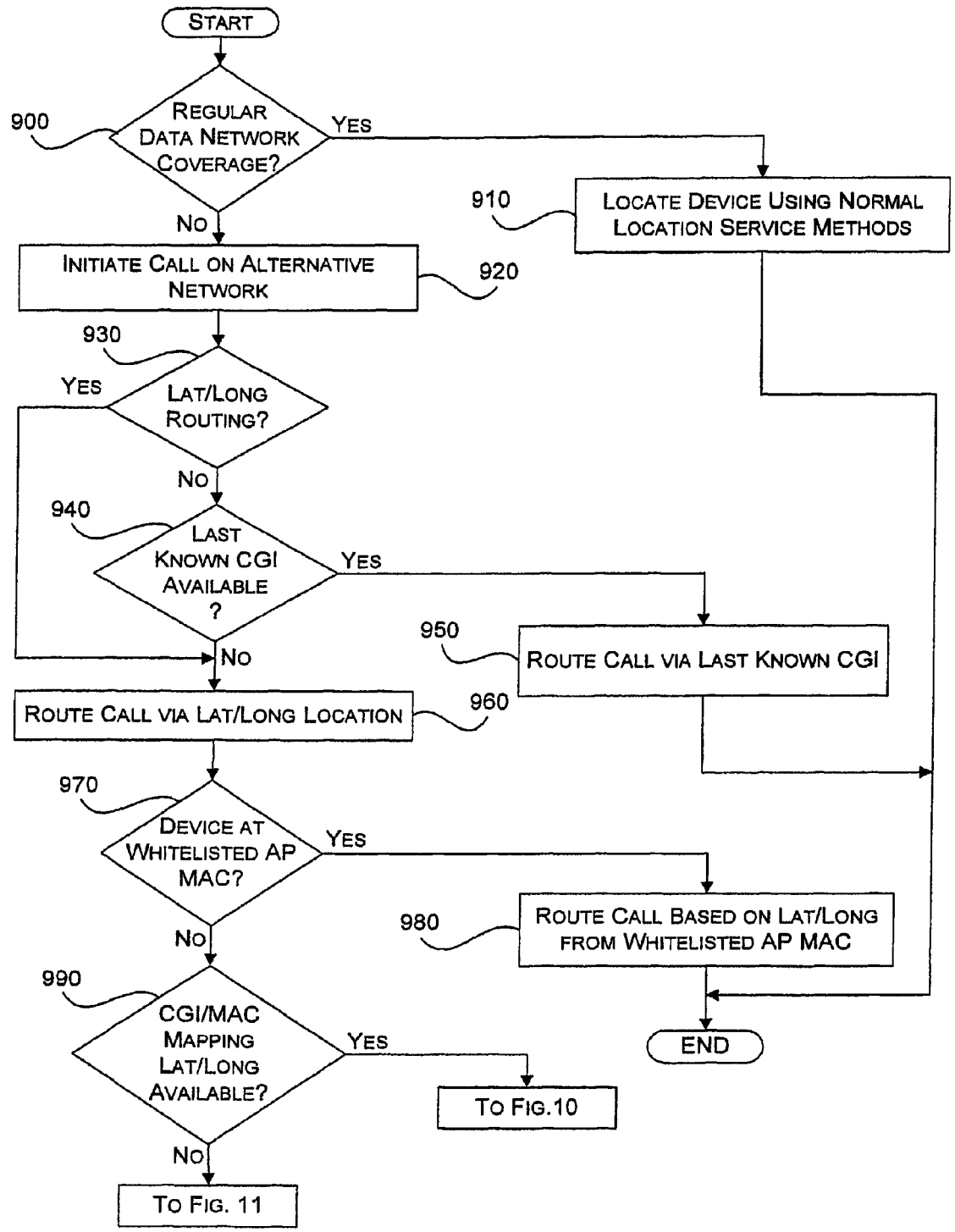
FIG. 9 is an illustration of a process for estimating the location of a mobile computing device.
Figure 10:
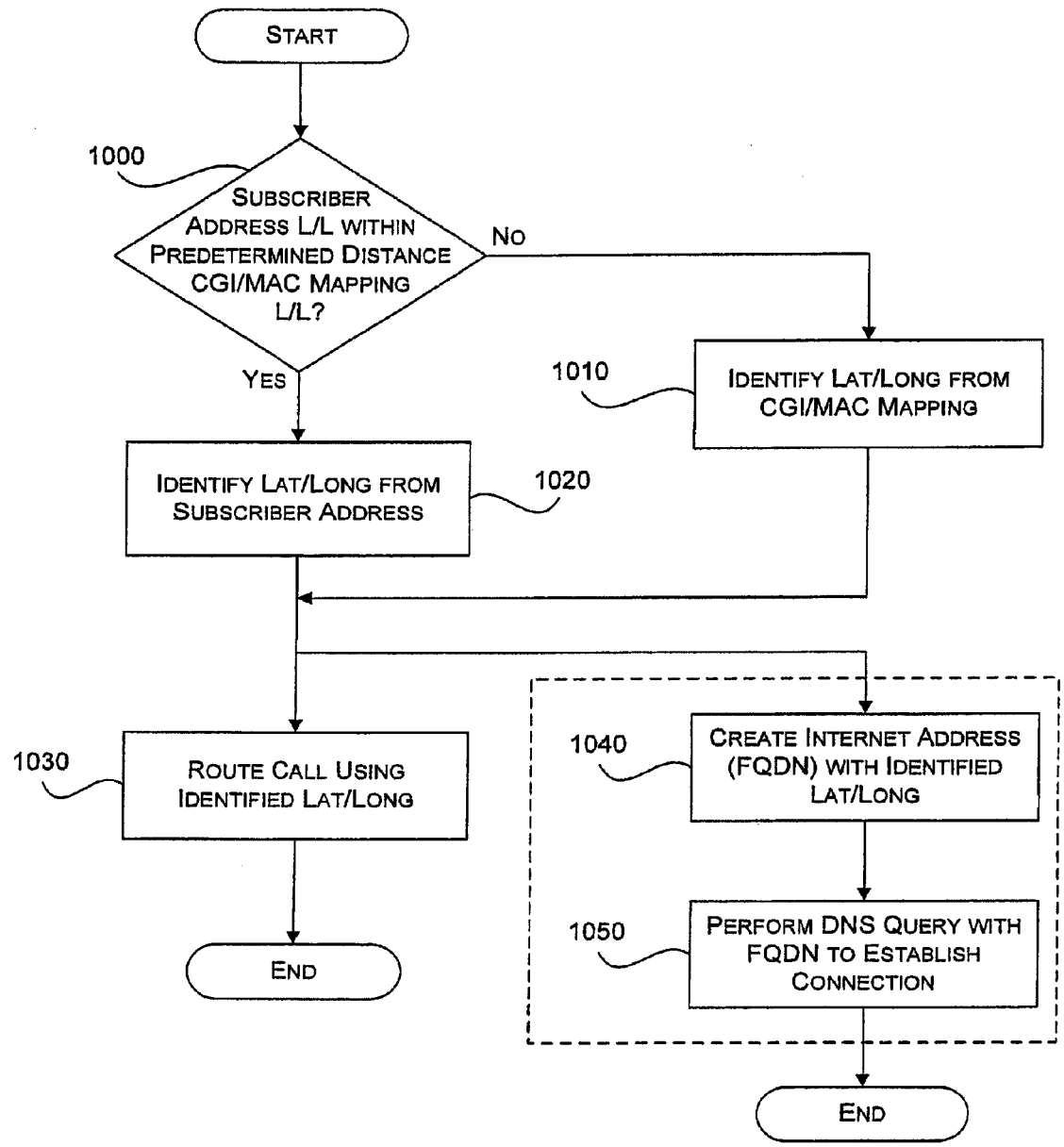
FIG. 10 is an illustration of a process for estimating the location of a mobile computing device.
Figure 11:
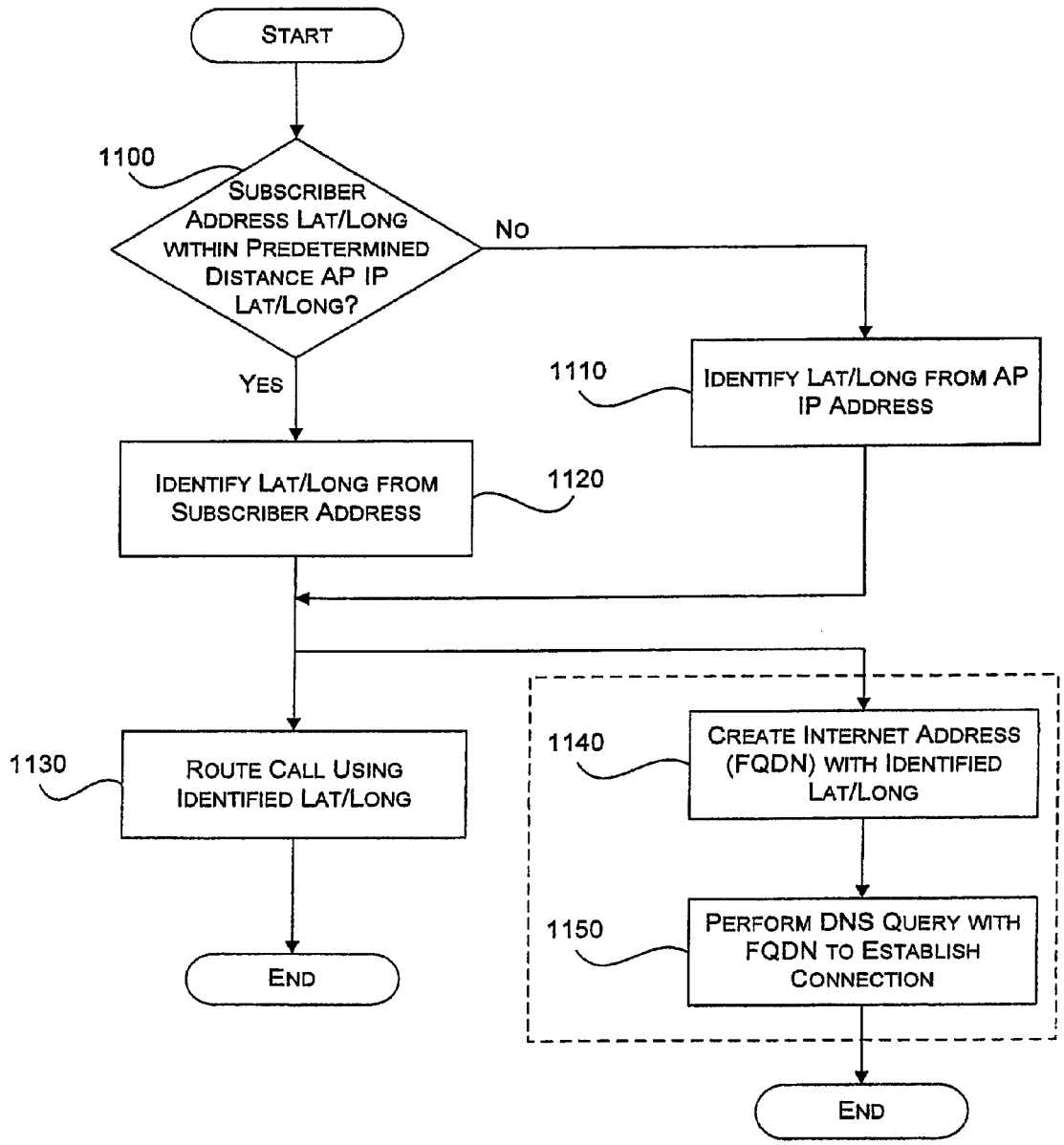
FIG. 11 is an illustration of a process for estimating the location of a mobile computing device.

FIGS. 9, 10 and 11 are operational flow diagrams illustrating a process for estimating the location of a mobile computing device. Referring to FIG. 9, a caller initiates an emergency call using a mobile computing device at a start block. The SMLC is arranged to algorithmically estimate the location of the mobile computing device. As discussed in detail below, the location estimate may be derived from: 1) the geographical location data of the access point (AP) on which the mobile computing device establishes an IP connection with the network controller (NC); 2) a mobile subscriber's home location when the subscriber accesses the network from home; 3) the last known cell global identity (CGI) associated with the mobile computing device; or 4) the public IP address of the mobile computing device.

Continuing to decision block 900, a determination is made whether regular data network coverage exists. Examples of a regular data network include a cellular network, a GSM network, or some other telephony network. If regular network coverage exists, processing continues at block 910 where the mobile computing device may be located on the regular data network because reliable positioning technologies support such devices on the regular data network. Processing then terminates at an end block. If regular data network coverage does not exist, processing continues from decision block 900 to block 920 where the mobile computing device initiates the call on the alternative IP-based telecommunications network (e.g., a UMA network, broadband internet, a digital subscriber line network, a cable network, etc.).

Advancing to decision block 930, a determination is made whether the mobile computing device utilizes routing based on latitude/longitude coordinate routing. If the mobile computing device utilizes routing based on latitude/longitude coordinate routing, processing continues at block 960. If the mobile computing device utilizes routing based on cell routing, processing continues at decision block 940 where a determination is made whether the last known cell global identity (CGI) is available. The last known CGI may be available from when the mobile computing device first connected to the data network as discussed above with reference to the scrubbing process. If the last known CGI is available, processing continues to block 950 where the call is routed based on the last known CGI. Processing then terminates at the end block. If the last known CGI is not available, processing continues to block 960 where the call is routed based on latitude/longitude coordinates. The last known CGI may not be available because the mobile computing device did not have a record of the last known CGI when the device connected to the network or the validity time period associated with the CGI has expired.

Moving to decision block 970, a determination is made whether the mobile computing device is accessing the network via an AP that is identified on a white list. The white list is a database of location information for APs that an operator owns and operates. The location information includes the MAC address associated with the AP. If the caller is initiating a call from a white listed AP, processing continues at block 980 where the call is routed based on the latitude/longitude coordinates associated with the MAC address of the AP. If the mobile computing device is accessing the network via an AP that is not identified on the white list, processing continues to decision block 990 where a determination is made whether a CGI to MAC address mapping of latitude/longitude coordinates is available. The CGI to MAC address mapping of latitude/longitude coordinates may be available in the data base discussed above with reference to the scrubbing process. If a CGI to MAC address mapping of latitude/longitude coordinates is available, processing continues to FIG. 10. If a CGI to MAC address mapping of latitude/longitude coordinates is not available, processing continues to FIG. 11.

Referring to FIG. 10, a CGI to MAC address mapping of latitude/longitude coordinates is available. A determination is made whether the CGI to MAC address mapping of latitude/longitude coordinates is within a first predetermined distance (e.g., 15 kms) of latitude/longitude coordinates of an address provided by the mobile subscriber at decision block 1000. If the CGI to MAC address mapping of latitude/longitude coordinates is not within the predetermined distance of latitude/longitude coordinates of the address provided by the mobile subscriber, processing continues to block 1010 where the latitude/longitude coordinates are identified from the CGI to MAC address mapping. If the CGI to MAC address mapping of latitude/longitude coordinates is within the predetermined distance of latitude/longitude coordinates of the address provided by the mobile subscriber, processing continues to block 1020 where the latitude/longitude coordinates are identified from the mobile subscriber's address (i.e., the caller is probably at home). In one embodiment, the mobile subscriber submits an emergency address to the service provider when mobile service is initiated. At block 1030, the call is routed based on the identified latitude/longitude coordinates. In an alternative embodiment, an internet address (e.g., a fully qualified domain name (FQDN)) is created based on the identified latitude/longitude coordinates at block 1040. A domain name server (DNS) query is performed using the FQDN to establish a connection between the mobile computing device and the data network at block 1050.

Referring to FIG. 11, a CGI to MAC address mapping of latitude/longitude coordinates is not available. A determination is made whether the latitude/longitude coordinates of the IP address associated with the AP is within a second predetermined distance (e.g., 50 kms) of the latitude/longitude coordinates of the address provided by the mobile subscriber at decision block 1100. If the latitude/longitude coordinates of the access point IP address is not within the predetermined distance of latitude/longitude coordinates of the address provided by the mobile subscriber, processing continues to block 1110 where the latitude/longitude coordinates are identified from the IP address of the AP. If the latitude/longitude coordinates of the IP address of the AP is within the predetermined distance of latitude/longitude coordinates of the address provided by the mobile subscriber, processing continues to block 1120 where the latitude/longitude coordinates are identified from the mobile subscriber's address (i.e., the caller is probably at home). At block 1130, the call is routed based on the identified latitude/longitude coordinates. In an alternative embodiment, an internet address (e.g., FQDN) is created based on the identified latitude/longitude coordinates at block 1140. A DNS query is performed using the FQDN to establish a connection between the MS and the data network at block 1150.

Figure 12:
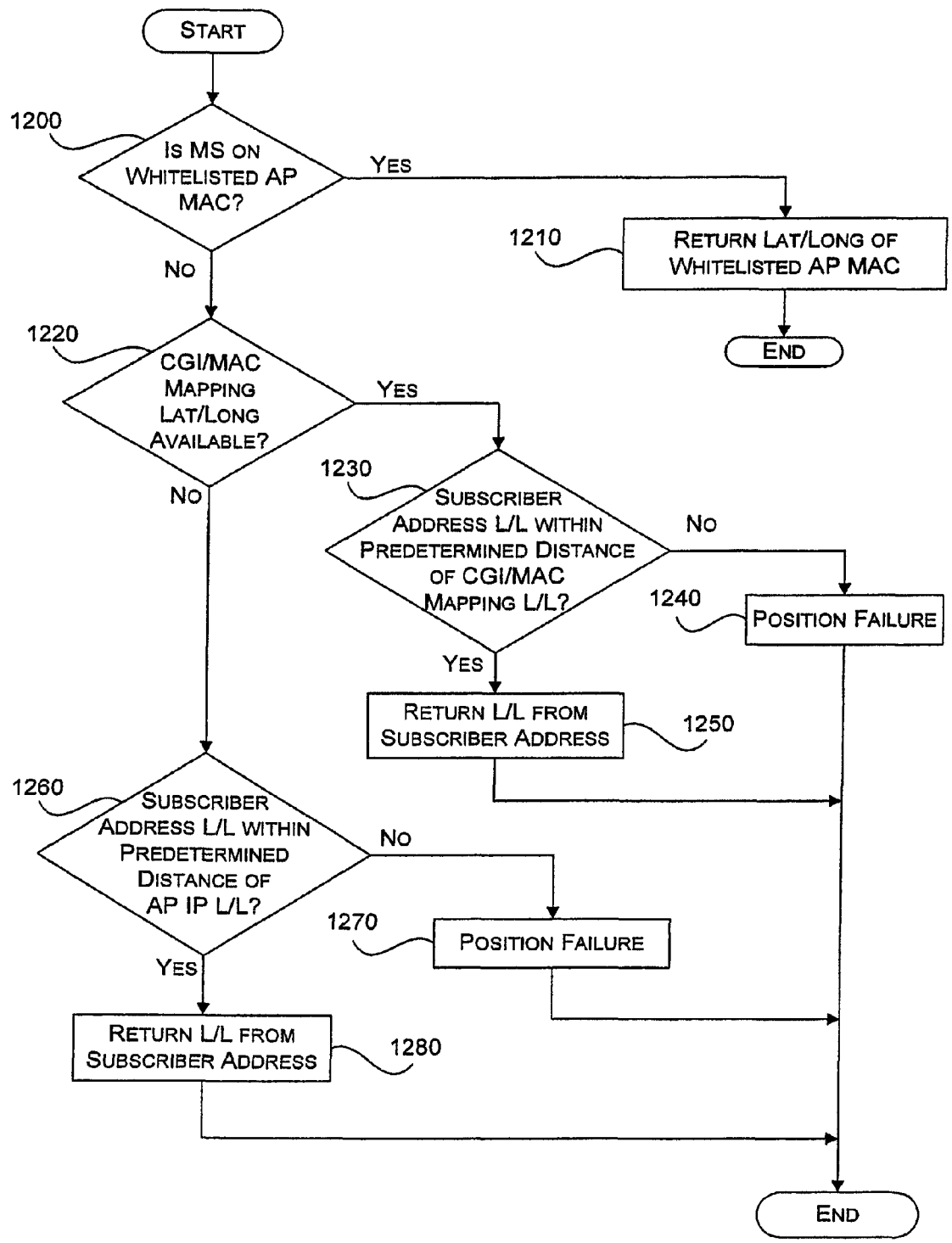
FIG. 12 is an illustration of a process for estimating a location of a mobile computing device.

FIG. 12 is an operational flow diagram illustrating a process for estimating a location of a mobile computing device or mobile subscriber (MS). A determination is made whether the MS is accessing the network via an AP that is identified on a white list at decision block 1200. The white list is a database of location information for APs that an operator owns and operates. The location information includes the MAC address associated with the AP. If the caller is initiating a call from a white listed AP, processing continues at block 1210 where the latitude/longitude coordinates associated with the MAC address of the AP is returned as the location of the MS. If the MS is accessing the network via an AP that is not identified on the white list, processing continues to decision block 1220 where a determination is made whether a CGI to MAC address mapping of latitude/longitude coordinates is available. The CGI to MAC address mapping of latitude/longitude coordinates may be available in the database discussed above with reference to the scrubbing process. If a CGI to MAC address mapping of latitude/longitude coordinates is available, processing continues to decision block 1230. If a CGI to MAC address mapping of latitude/longitude coordinates is not available, processing continues to decision block 1260.

Moving to decision block 1230, a determination is made whether the CGI to MAC address mapping of latitude/longitude coordinates is within a first predetermined distance (e.g., 15 kms) of latitude/longitude coordinates of an address provided by the MS. If the CGI to MAC address mapping of latitude/longitude coordinates is not within the predetermined distance of latitude/longitude coordinates of the address provided by the mobile subscriber, processing continues to block 1240 where a position failure results. If the CGI to MAC address mapping of latitude/longitude coordinates is within the predetermined distance of latitude/longitude coordinates of the address provided by the mobile subscriber, processing continues to block 1250 where the latitude/longitude coordinates associated with the mobile subscriber's address is returned as the location of the MS.

Continuing to decision block 1260, a determination is made whether the latitude/longitude coordinates of the IP address of the AP is within a second predetermined distance (e.g., 50 kms) of the latitude/longitude coordinates of the address provided by the mobile subscriber. If the latitude/longitude coordinates of the access point IP address is not within the predetermined distance of latitude/longitude coordinates of the address provided by the mobile subscriber, processing continues to block 1270 where a position failure results. If the latitude/longitude coordinates of the access point IP address is within the predetermined distance of latitude/longitude coordinates of the address provided by the mobile subscriber, processing continues to block 1280 where the latitude/longitude coordinates associated with the mobile subscriber's address is returned as the location of the MS.

The location of a mobile computing device is determined based on the latitude/longitude coordinates of at least one of: an AP, a cell tower, an IP address, and a subscriber provided address. Many location service applications are not related to locating a mobile subscriber for emergency purposes. Each location determination for non-emergency purposes is associated with an uncertainty rating that identifies the reliability of the location determination. For example, latitude/longitude coordinates for a cell tower may have an uncertainty rating of 15 kms. Latitude/longitude coordinates for an AP identified by MAC address may have an uncertainty rating of 50 kms. Latitude/longitude coordinates for an AP at a specific known location may have an uncertainty rating of 100 meters.

Latitude/longitude coordinates for a subscriber provided address may have an uncertainty rating of 200 meters. A request to locate the mobile computing device may identify a minimum accuracy requirement such that the location determination with the highest uncertainty rating that satisfies the request is returned.

The location service application determines what level of accuracy is necessary. For example, a weather reporting application may not require a high level of accuracy when determining the mobile subscriber's location to forward an accurate weather report to the subscriber's mobile computing device. In contrast, a law enforcement locator application may require a much higher level of accuracy when locating a suspect. Furthermore, a suspect provided address may be deemed highly inaccurate by law enforcement. If the location service application does not specify a minimum uncertainty rating, the location determination with the highest uncertainty value is returned.

In some example systems, one or more mobile subscriber devices may include facility for determining their own location utilizing global positioning system (GPS) technology. GPS data (e.g., lat/long coordinates) from the mobile subscriber device can then be communicated to the network controller (NC) during the registration process. The network controller can subsequently store the GPS data in a database such as the NC database previously described. Once the GPS data is in the database, other registration requests from non-GPS devices can located by evaluating information in the database including the GPS data from other devices.

Two Stage Location Determination

As was previously described, the location of a mobile subscriber using a mobile device may be estimated based on: (1) a known geographic location of the access point through which the mobile device establishes an IP connection with the network controller; (2) an address of the subscriber's residence (if the subscriber accesses the network from an access point in or near his or her residence); (3) a cell global identity (CGI) associated with a cell tower that was last utilized by the mobile device or by other mobile devices prior to using the access point; or (4) an IP address of the access point. When the location of the mobile subscriber is determined using any or all of these methods, the estimated locations that are calculated may be stored in NC database. Such stored locations may be used in lieu of constantly recalculating the location of the mobile device, particularly if the mobile device continues to access the same access point and therefore has little or no practical change in location.

The majority of services that use the location of a mobile subscriber to provide location-based services may find the accuracy of the previously-described methods of estimating location to be sufficient. For example, a user who requests a local weather report on his or her mobile device may find a weather report that is based on a location calculated using any of the previously-described methods to be adequate. Some services, however, may desire a higher degree of location accuracy. Emergency services such as E911 would certainly benefit by having the most accurate information about the location of a mobile subscriber. Moreover, other services that recommend businesses or other sites of interest in the location of the mobile subscriber would also benefit from a greater degree of location accuracy, as the services would be able to better tailor requested information or recommendations to the mobile subscriber.

When a higher degree of location accuracy is desirable, other methods may be used to more precisely locate the mobile device used by the subscriber. As previously described, a mobile device may calculate its location utilizing global positioning system (GPS) technology. Latitude and longitude coordinates calculated using GPS satellite signals may be communicated from the mobile subscriber device to the network controller (NC) during the registration process. Assisted GPS (or A-GPS) may also be used to determine the location of the mobile device. A-GPS relies on an Assistance Server to provide a reliable position in situations where there is poor GPS signal strength, such as in large cities. The mobile device or network controller may share sufficient data with the Assistance Server to provide a higher degree of accuracy in the location determination. Regardless of the GPS technology used to determine the location, the network controller can subsequently store the GPS-derived location in the NC database and use the location for subsequent location determination of the same or other mobile devices using the access point.

A disadvantage to relying on GPS-based technologies, however, is the additional time that it takes to receive the enhanced location provided by such technologies. Such a delay may impact the delivery of services to mobile subscribers in a timely fashion. A system and method of mitigating the delay of using GPS-based technologies is therefore disclosed herein. The system utilizes a two stage location determination method. During the first stage, an estimated position of the mobile device is immediately provided based on the most accurate stored location information that is available to the system. If greater accuracy is still required, during the second stage a more accurate position of the mobile device is provided using GPS-based technologies.

Figure 13:
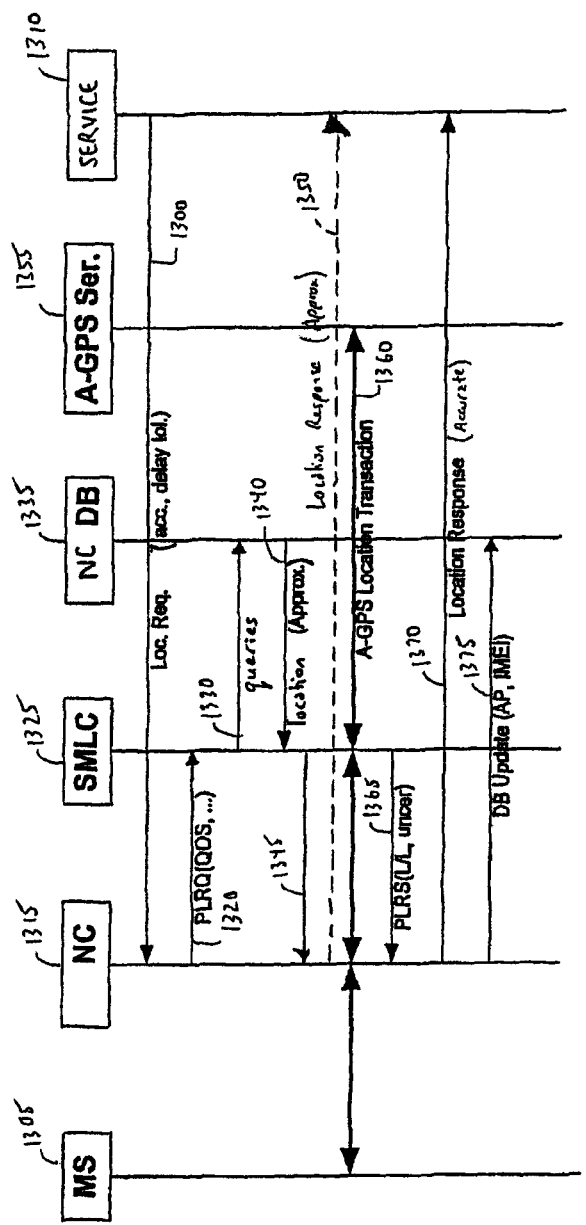
FIG. 13 is a communication diagram reflecting an exchange of messages in a two-stage process when a request is made by an external service to receive a position of a mobile subscriber.

FIG. 13 is a communication diagram reflecting an exchange of messages in a two-stage process when a request is made by an external service to receive a position of a mobile subscriber. A location request 1300 pertaining to a mobile subscriber 1305 is initially made by a service 1310 to a network controller 1315. The service may specify in the request whether low or high location accuracy is required, and may specify an acceptable delay tolerance (i.e., the amount of time the service can wait before receiving a response to the location request). The location accuracy may be specified as a numerical value (e.g., within 50 meters, within 1 kilometer) or as a relative measure (e.g., high, medium, low). Similarly, the acceptable delay tolerance may be specified as a numerical value (e.g., within 3 seconds, within 10 seconds) or as a relative measure (e.g., immediately, moderate delay acceptable).

After receiving the location request, the network controller 1315 transmits a position location request (PLRQ) message 1320 to a serving mobile location center (SMLC) 1325. The PLRQ message includes information associated with a quality of service (QoS), a device or subscriber identifier (MSID), and an SCCP identifier (SCCPID) that are associated with the mobile subscriber for which location information is being sought. Utilizing the received information in the PLRQ message, in a first stage of processing the SMLC 1325 makes one or more queries 1330 of an NC database 1335 to identify stored location data about the mobile subscriber that can readily be provided to the service with minimal delay. The NC database provides location data 1340 in response to the queries. The location data may include one or more locations of the mobile subscriber that were determined using the previously-described location estimation techniques.

The SMLC 1325 receives the location data from the NC database, and determines what location estimate to provide to the requesting service 1310. The SMLC analyzes the data in order to select the location estimate having the highest accuracy that it can provide to the service. The location estimate that is provided will depend on the location data that has been previously stored in the NC database. The following Table 1 reflects which location estimate is provided by the SMLC in the presence of different stored data. A "1" in the table indicates the presence of a location estimate calculated using the method indicated at the top of each column, a "0" in the table indicates the absence of a location estimate calculated using the corresponding method, and an "X" in the table indicates that the presence or absence of a location estimate is ignored.

TABLE 1

Highest Accuracy Location Available in NC Database Query

| W-AP | G-AP | IMEI | Sub ID | CGI | Pub-IP | Add'l Rule | Highest Accuracy |
|---|---|---|---|---|---|---|---|
| 0 | 0 | 1 | X | X | X | | IMEI |
| 0 | 1 | 0 | X | X | X | | G-AP |
| 0 | 1 | 1 | X | X | X | | IMEI |
| 1 | 0 | 0 | X | X | X | | W-AP |
| 1 | 0 | 1 | X | X | X | | W-AP |
| 1 | 1 | 0 | X | X | X | | W-AP |
| 1 | 1 | 1 | X | X | X | | W-AP |
| 0 | 0 | 0 | 1 | 0 | 0 | | Sub ID |
| 0 | 0 | 0 | 1 | 1 | X | <radius A | Sub ID |
| 0 | 0 | 0 | 1 | 1 | X | >radius A | CGI |
| 0 | 0 | 0 | 1 | 0 | 1 | <radius B | Sub ID |
| 0 | 0 | 0 | 1 | 0 | 1 | >radius B | Pub-IP |
| 0 | 0 | 0 | 0 | 0 | 1 | | Pub-IP |
| 0 | 0 | 0 | 0 | 1 | X | | CGI |

Where "W-AP" is the location of a white-listed access point (searched by MAC address), "G-AP" is the GPS location of an access point obtained from a mobile device (searched by MAC address); "IMEI" is a previously-determined GPS location for the mobile device (searched by IMEI); "Sub ID" is the subscriber's physical address (searched by the mobile device or subscriber identifier (e.g., IMSI)); "CGI" is the location of the last cell site reported by the mobile device (searched by CGI); and "Pub-IP" is the location of the center of the mobile device's public IP address serving area (searched by IP). As an example, if location estimates are available that are based on the W-AP and G-AP methods but not based on the IMEI method (i.e., the sixth row of the table), then the SMLC would use the location estimate calculated using the W-AP method since it provides the highest degree of accuracy among all of the methods for which there is stored data.

For some rows of the table, an additional rule is applied to determine which location estimate to use. Radius A applies to the distance of the subscriber's address from the CGI location, and may be a distance such as 15 km. If the subscriber's address is less than 15 km from the CGI location, the first row is applied, and if the subscriber's address is greater than 15 km from the CGI location, the second row applied. Radius B applies to the distance of the subscriber's address from the center of the IP serving area, and may be a distance such as 50 km. If the subscriber's address is less than 50 km from the center of the IP serving area, the first row is applied, and if the subscriber's address is greater than 50 km from the center of the IP serving area, the second row is applied. For example, if location estimates are available that are based on the mobile device or subscriber identifier (e.g., an IMSI) and the Pub-IP methods, and if the subscriber's address is less than 50 km from the center of the IP serving area, then the location estimate based on the Sub ID method will be used.

With reference to FIG. 13, once the SMLC 1325 has identified the location estimate with the highest degree of accuracy, the SMLC may transmit a location message 1345 containing the estimated location of the mobile device to the network controller 1315. Whether or not a location message is transmitted depends on a number of factors. In some circumstances, the estimated location determined by the SMLC may be of insufficient accuracy for the requesting service. For example, the desired accuracy provided by the service 1310 in the initial location request may not be met by the stored location estimates. In some circumstances, the SMLC may not be able to return any location estimates, such as if there is no stored location data or if the location estimates stored in the NC database are sufficiently dated as to be unreliable. And in some circumstances, the requesting service 1310 may need an initial location estimate in a short time period, but may also benefit from a more accurate location to be provided over a longer time period. For example, an E911 call from a mobile device may be quickly routed based on a location estimate, but ultimately the E911 dispatcher would benefit from a more accurate location in order send appropriate parties to the correct location in response to the call. If a location message that includes the estimated location is therefore warranted, the network controller provides the estimated location to the requesting service 1310 in a location response message 1350. Because the location was determined based on stored information, the location response message may be sent in a timely fashion that allows the service to quickly take action based on the location.

Whether or not a location response message 1350 was sent to the service 1310, the system may begin a second stage of processing by initiating an Assisted-GPS or other GPS location determination transaction 1360. The transaction involves the exchange of one or more messages between the mobile subscriber 1305, the network controller 1315, the SMLC 1325, and an A-GPS service 1355 (if A-GPS is utilized). Those skilled in the art will appreciate that additional delay is introduced in the second stage processing by the communication with the mobile subscriber (if relying on GPS positioning from the mobile device) and the A-GPS service (if utilized). Any location estimates that were previously stored in the NC database 1335 may be provided to the A-GPS service or to the mobile device in order to assist the service or device in providing a more accurate location determination. Seeding the A-GPS service or mobile device with some or all of the available location data will improve the overall accuracy of the determined location.

After the mobile subscriber 1305 or A-GPS service 1310 calculates an actual location of the mobile device, the location is provided to the SMLC. ("Actual location" is used in this context to mean the location of the mobile device calculated within the accuracy of the utilized GPS positioning technology.) The SMLC sends a position location response (PLRS) message 1365 to the network controller. The PLRS message includes the latitude-longitude coordinates (L/L) of the mobile device, as well as an uncertainty rating associated with the coordinates and the SCCPID. The network controller transmits a location response 1370 to the requesting service 1310. The location response includes a location of greater accuracy than any location response sent after the first stage of processing. The requesting service 1310 may use the higher accuracy location to provide tailored services to the mobile subscriber. The disclosed two stage processing is therefore advantageous in that it allows an initial quick response with an estimated location, followed by a delayed response with an actual location of a mobile device.

In some embodiments, if the A-GPS service is unable to provide an actual location that meets the accuracy requested by the service, the network controller may instead provide a message to the service indicating that the requested location is not currently available. In some embodiments, if the A-GPS service is unable to provide an actual location, and if the system had not previously provided a location estimate at the end of the first stage of processing, then the system may provide a location estimate that was retrieved from the NC database 1335 in lieu of providing an actual location from the A-GPS service.

After providing the location response to the service 1310, the network controller may generate one or more commands 1375 to store the more accurate information in the NC database 1335. The actual location may be stored in association with the mobile subscriber and the access point. The stored location may be subsequently accessed and utilized by the network controller, such as during a first stage of processing to identify the location of the same or other mobile devices accessing the network through the access point.

Although the invention has been described herein by way of exemplary embodiments, variations in the structures, systems, methods and processes described herein may be made without departing from the spirit and scope of the invention. For example, the positioning of the various functional or physical components may be varied. Individual components and arrangements of components may be substituted as known to the art. Since many embodiments of the invention can be made without departing from the spirit and scope of the invention, the invention is not limited except as by the appended claims.

We claim:

1. A method in a computing system of determining a geographic location associated with a wireless mobile device accessing a data network, the method comprising:
receiving a request for a location of a wireless mobile device that is connected to the data network through an access point operating on unlicensed frequency spectrum,
wherein the request includes a location accuracy requirement;
determining an estimated location of the wireless mobile device by accessing stored location information;
providing the estimated location in a first response to the request for the location of the wireless mobile device; and
when the provided estimated location fails to meet the location accuracy requirement, then
determining a GPS location of the wireless mobile device by using information derived from global positioning system (GPS) signals; and
providing the GPS location of the wireless mobile device in a second response to the request for the location of the wireless mobile device.

2. The method of claim 1, wherein the location accuracy requirement is a numerical value.

3. The method of claim 1, wherein the location accuracy requirement is a relative measure.

4. The method of claim 1, further comprising:
where the provided GPS location fails to meet the location accuracy requirement, providing a message indicating that the requested location is not available.

5. The method of claim 1, wherein the access point is identified by at least one of: a media access control (MAC) address or an internet protocol (IP) address.

6. The method of claim 1, further comprising storing the GPS location of the wireless mobile device.

7. The method of claim 1, wherein information derived from the GPS signals is used by an Assisted GPS service to determine the GPS location of the wireless mobile device.

8. The method of claim 1, further comprising routing a call from the wireless mobile device based on the estimated location.

9. The method of claim 1, wherein the estimated location and the GPS location is identified by a latitude and longitude coordinate system.

10. The method of claim 1, wherein the stored location with the highest uncertainty rating that satisfies the location accuracy requirement is provided.

11. The method of claim 1, further comprising:
receiving the location of the wireless mobile device; and
providing the received location of the wireless mobile device to a requesting location-based service.

12. The method of claim 1, wherein the requesting location-based service is a commercial location-based service.

13. A system for determining a geographic location associated with a mobile device that is wirelessly accessing a data network, the system comprising:
a first location estimator configured to provide an estimated location of a mobile device that is accessing the data network via an access point operating on unlicensed frequency spectrum,
wherein the first location estimator is configured to determine the estimated location of the mobile device by accessing stored location information, and
wherein the first location estimator is configured to provide the estimated location in a first response to a request for a position of the mobile device; and
a second location estimator configured to provide a GPS location of the mobile device,
wherein the second location estimator is configured to initiate a communication with the mobile device that causes the mobile device to calculate its GPS location using information derived from global positioning system (GPS) signals and communicate the GPS location to the second location estimator,
wherein the second location estimator is configured to provide the GPS location in a second response to the request for the position of the mobile device, and
wherein the second location estimator is utilized when the provided estimated location fails to meet a location accuracy requirement.

14. The system of claim 13, wherein the location accuracy requirement is a relative measure.

15. The system of claim 13, further comprising:
where the provided GPS location fails to meet the location accuracy requirement,
a messaging component configured to provide a message indicating that the requested position of the mobile device is not available.

16. The system of claim 13, further comprising:
a storage component configured to store the GPS location of the wireless mobile device.

17. The system of claim 13, wherein the access point is identified by at least one of: a media access control (MAC) address or an internet protocol (IP) address.

18. The system of claim 13, wherein information derived from the GPS signals is used by an Assisted GPS service to determine the GPS location of the wireless mobile device.

19. At least one non-transitory computer-readable medium storing instructions for determining a geographic location associated with a wireless mobile device accessing a data network, comprising:
receiving a request for a location of a wireless mobile device that is connected to the data network through an access point operating on unlicensed frequency spectrum;
determining an estimated location of the wireless mobile device by accessing stored location information;
providing the estimated location in a first response to the request for the location of the wireless mobile device;
determining an estimated location of the wireless mobile device by accessing stored location information;
providing the estimated location in a first response to the request for the location of the wireless mobile device; and
when the provided estimated location fails to meet a location accuracy requirement, then
determining a GPS location of the wireless mobile device by using information derived from global positioning system (GPS) signals; and
providing the GPS location of the wireless mobile device in a second response to the request for the location of the wireless mobile device.

20. The at least one non-transitory computer-readable medium of claim 19, wherein the request includes the location accuracy requirement.

* * * * *